Feb. 28, 1956   G. C. ELLERBECK   2,736,492
SQUARE ROOT MECHANISM
Filed Feb. 8, 1951   11 Sheets-Sheet 1
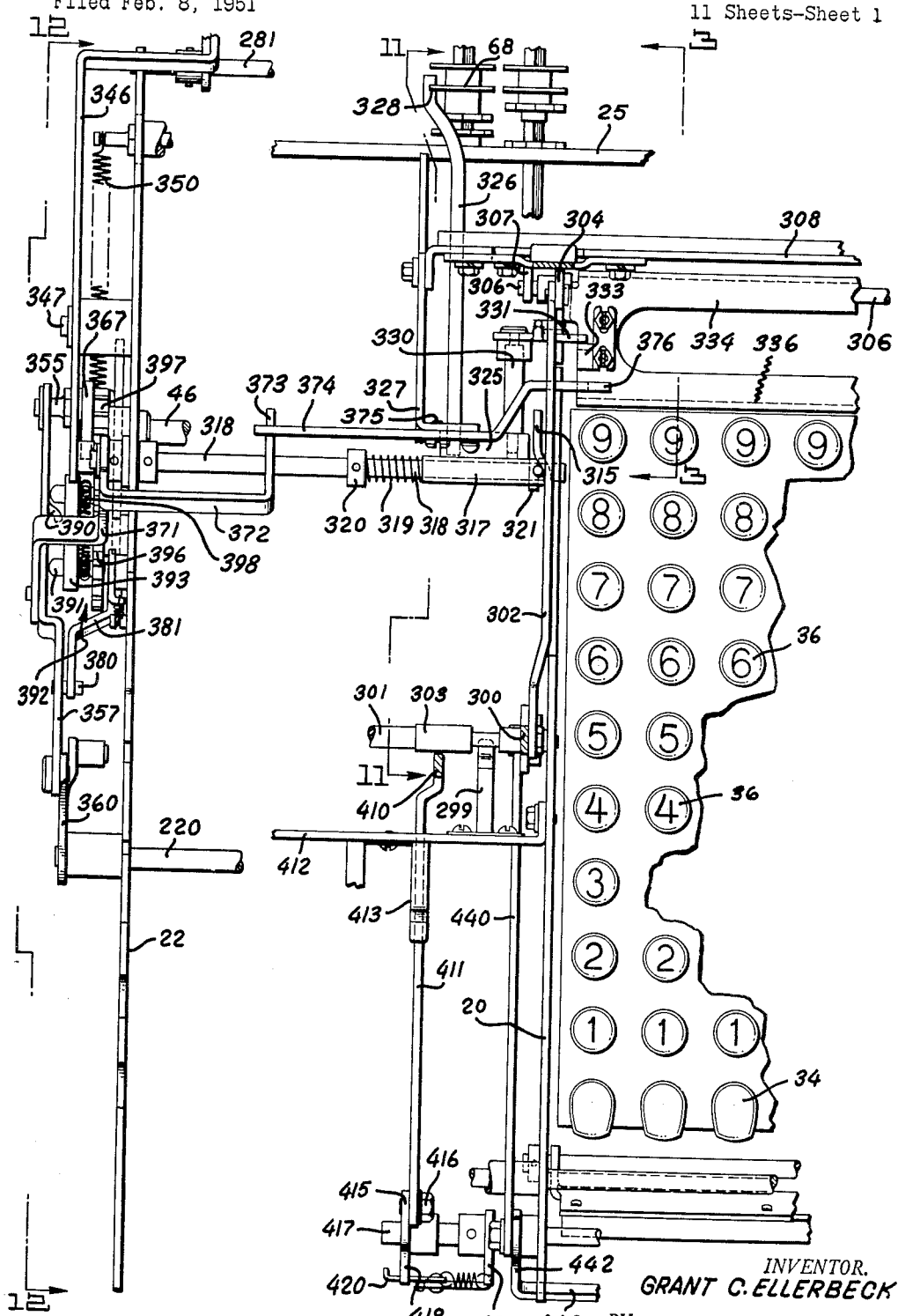
FIG_1
INVENTOR.
GRANT C. ELLERBECK
BY
ATTORNEY

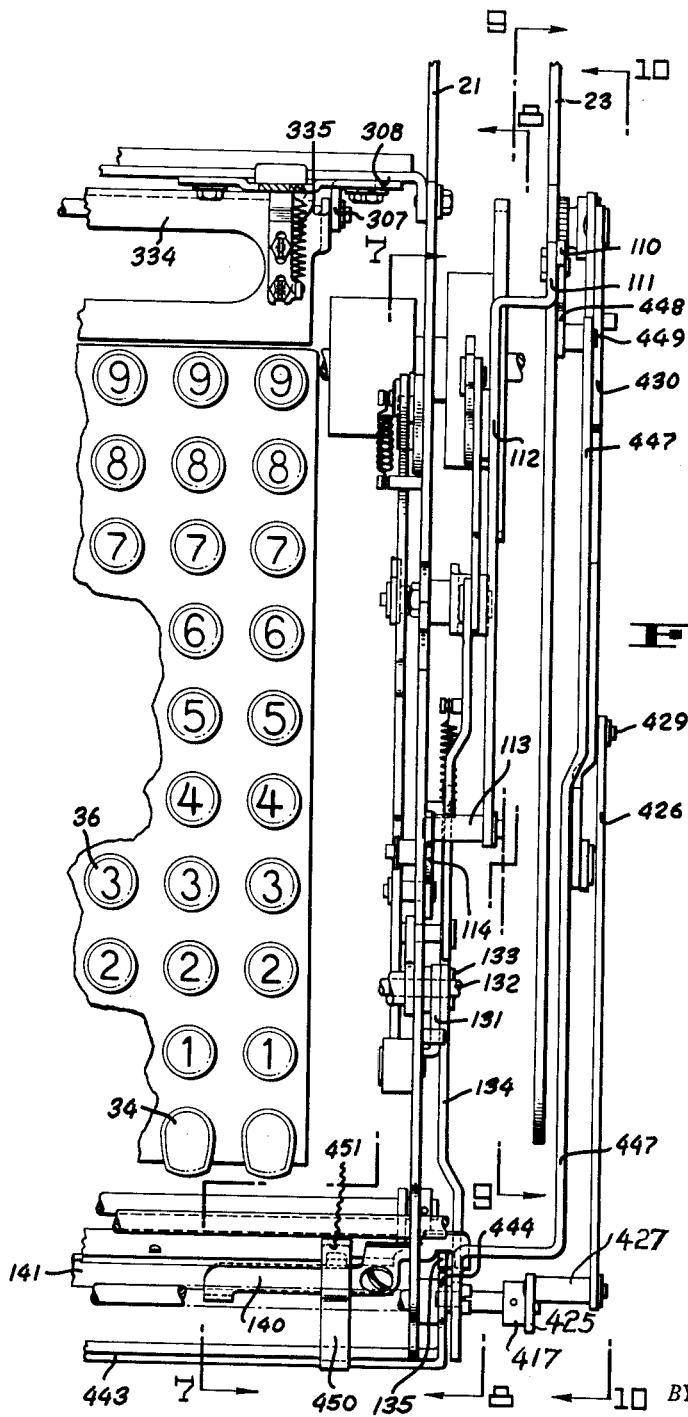

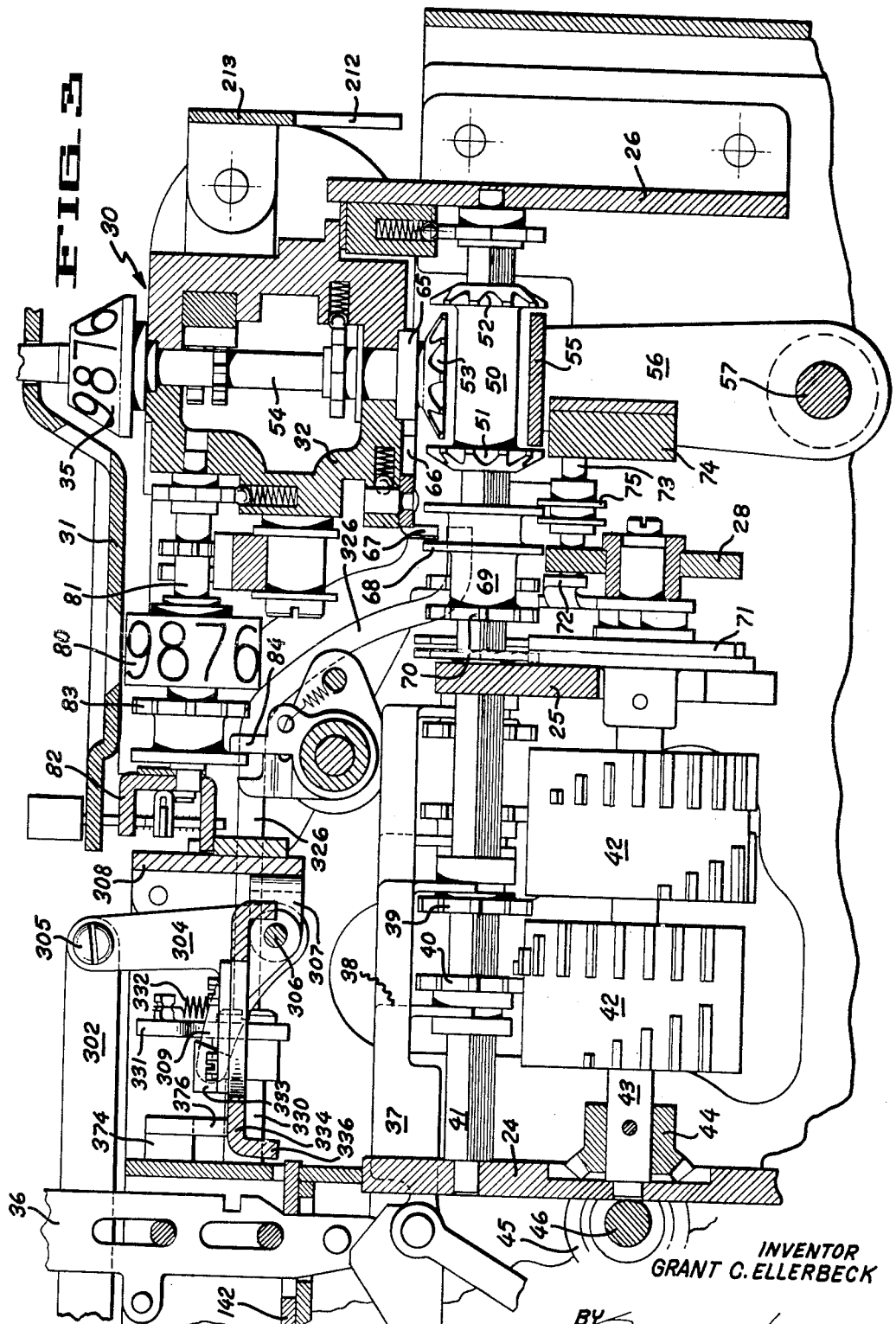

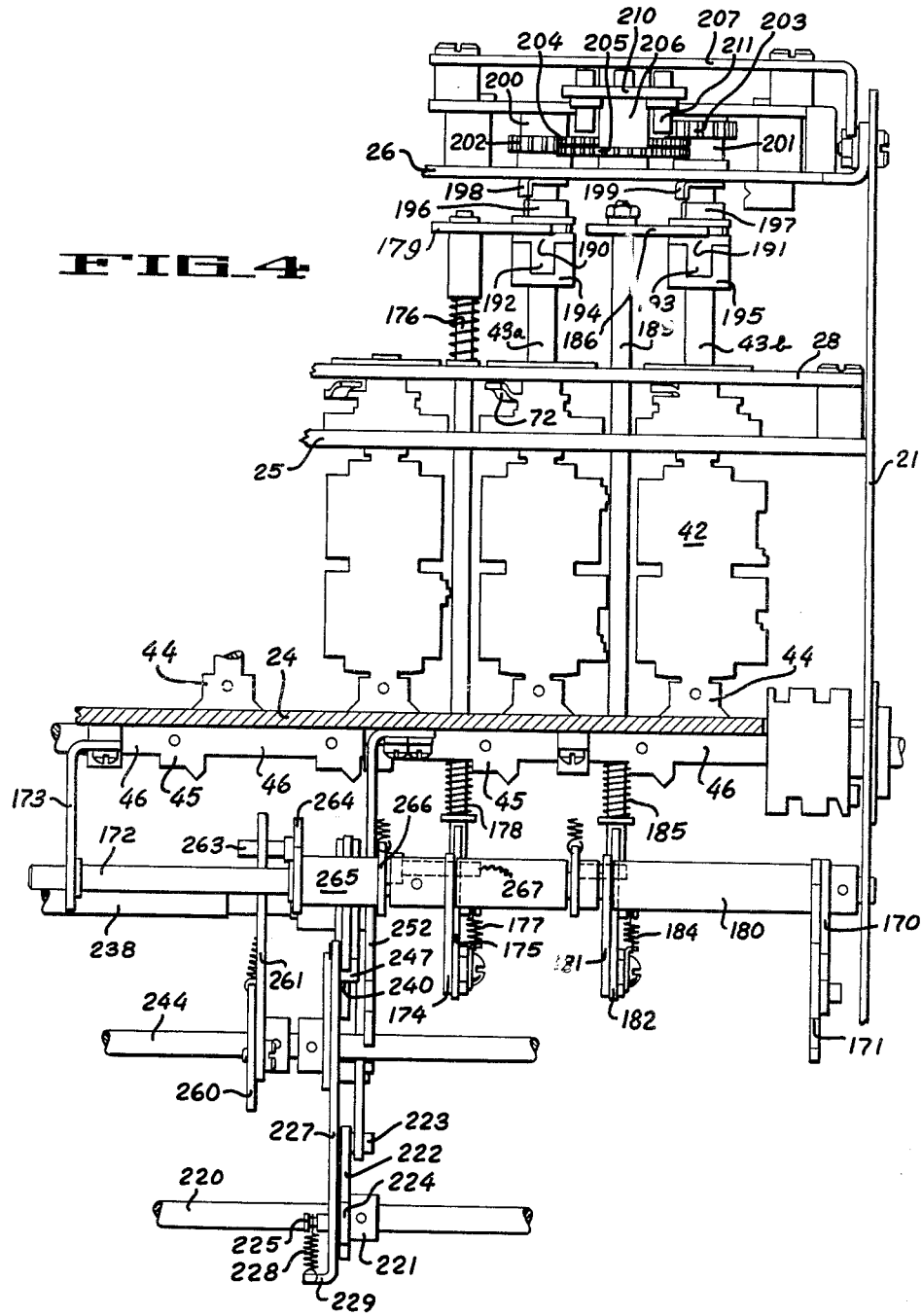

Feb. 28, 1956     G. C. ELLERBECK     2,736,492
SQUARE ROOT MECHANISM
Filed Feb. 8, 1951                         11 Sheets-Sheet 5
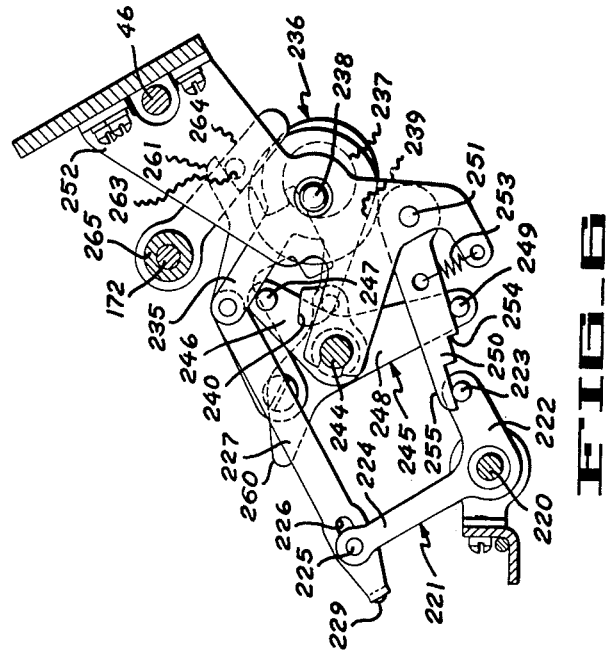
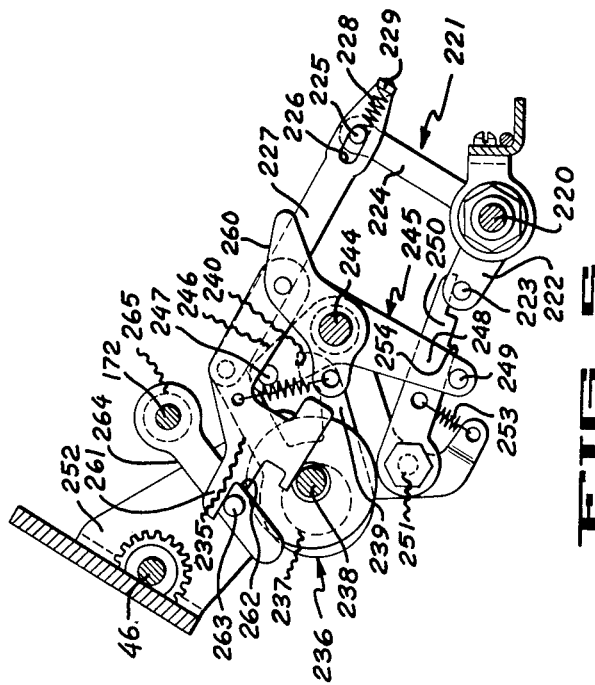
INVENTOR.
GRANT C. ELLERBECK
BY 
ATTORNEY

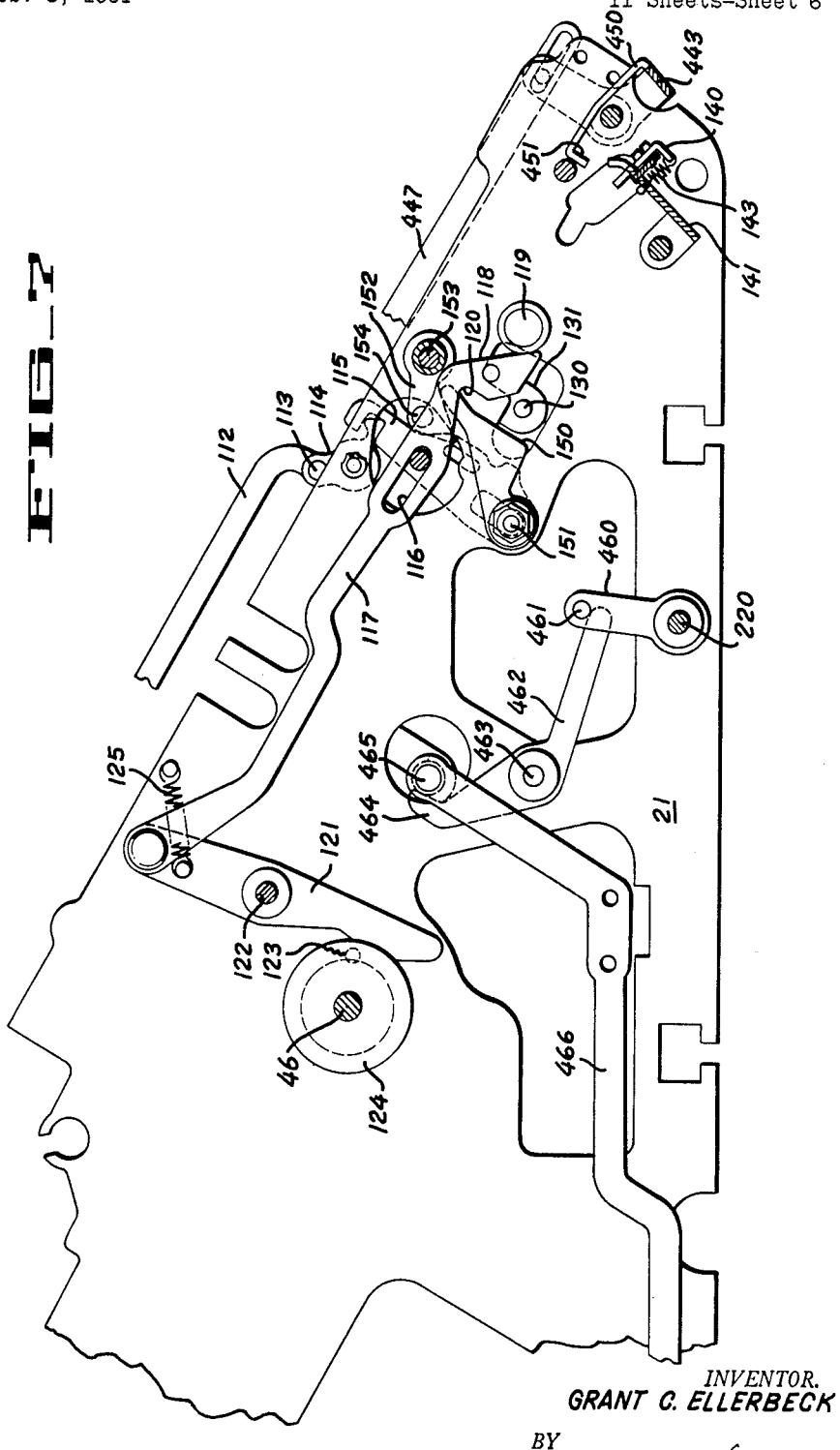

Feb. 28, 1956  G. C. ELLERBECK  2,736,492
SQUARE ROOT MECHANISM
Filed Feb. 8, 1951  11 Sheets-Sheet 7
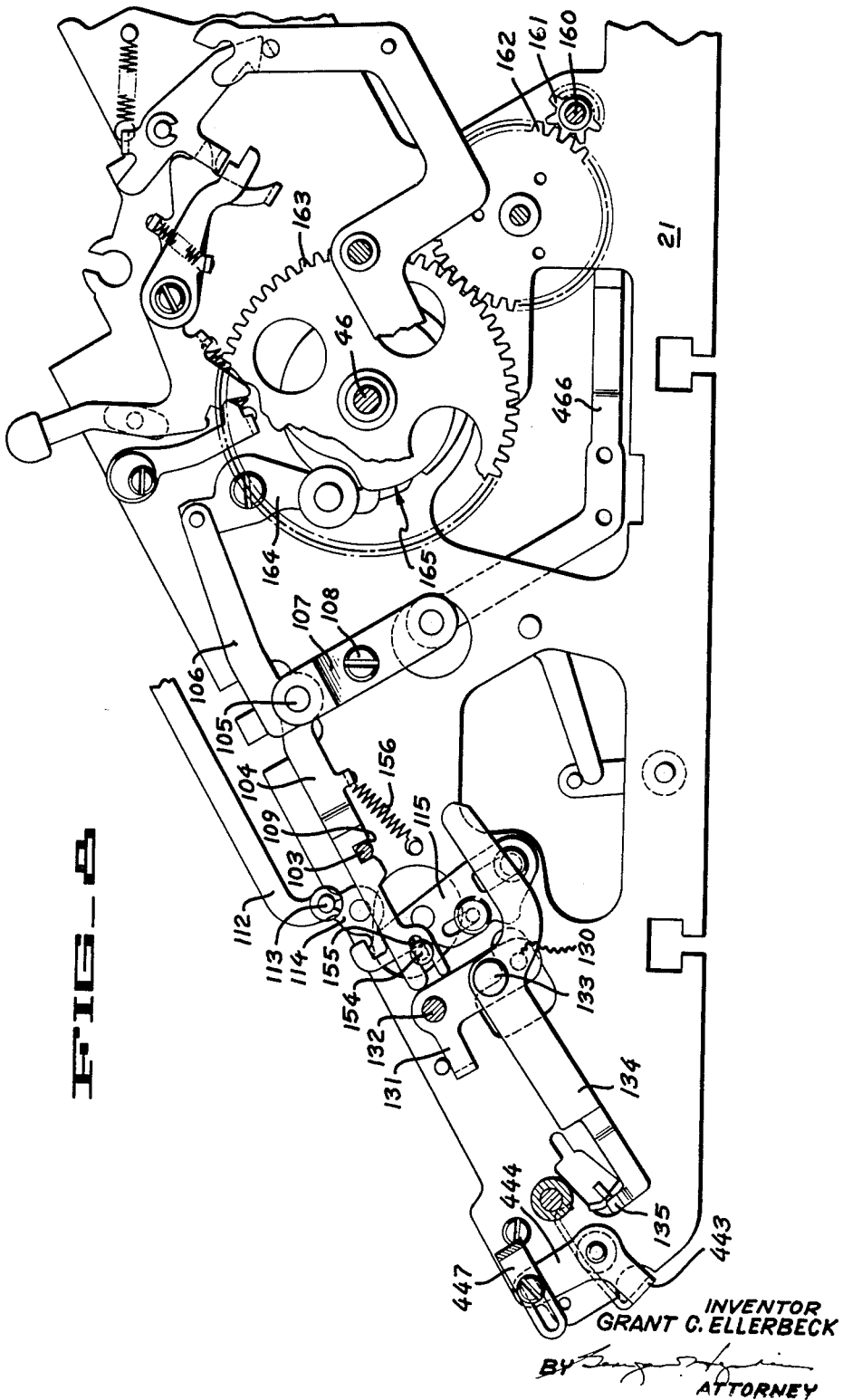
INVENTOR
GRANT C. ELLERBECK
BY
ATTORNEY

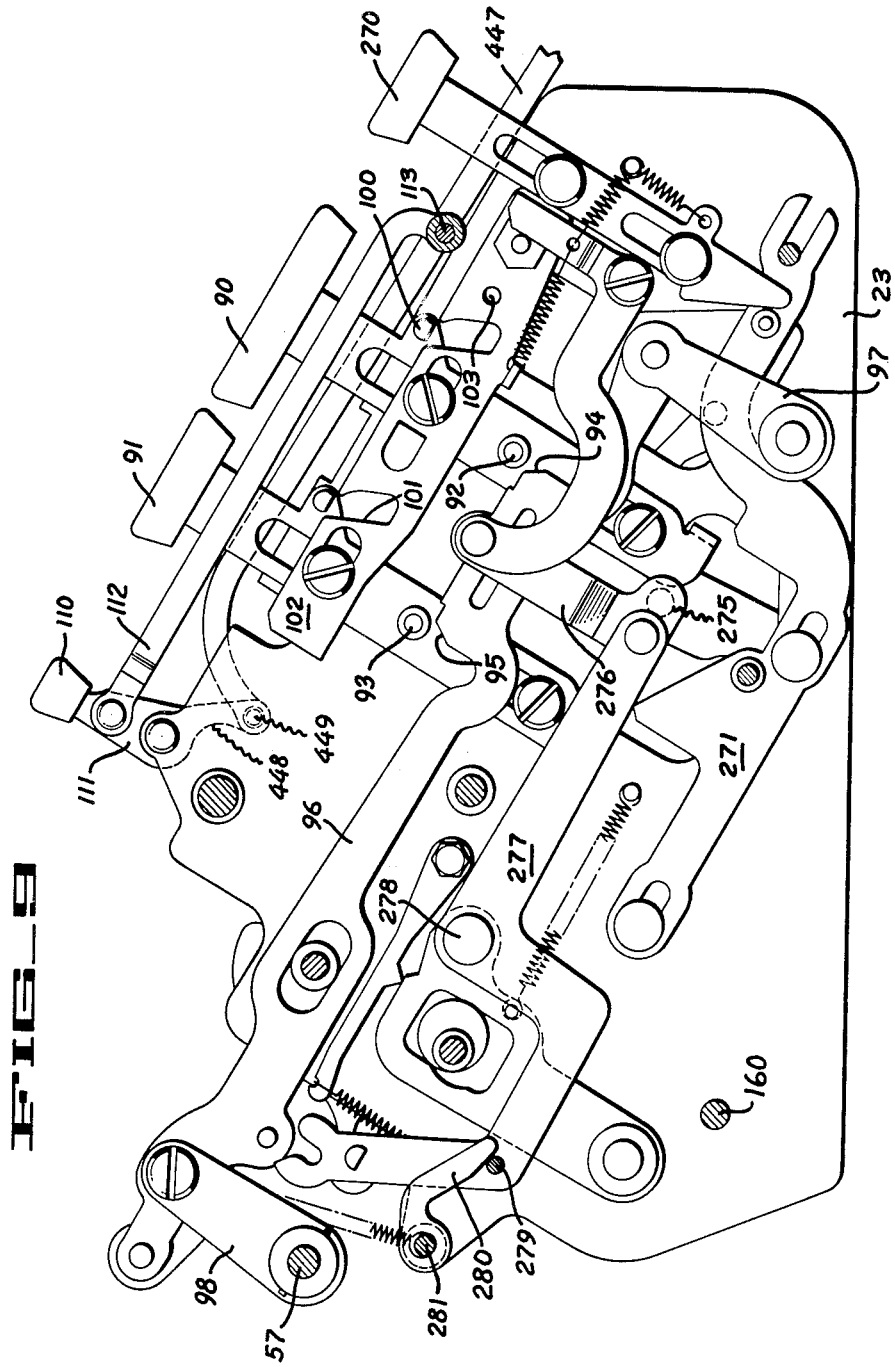

Feb. 28, 1956   G. C. ELLERBECK   2,736,492
SQUARE ROOT MECHANISM
Filed Feb. 8, 1951   11 Sheets-Sheet 9
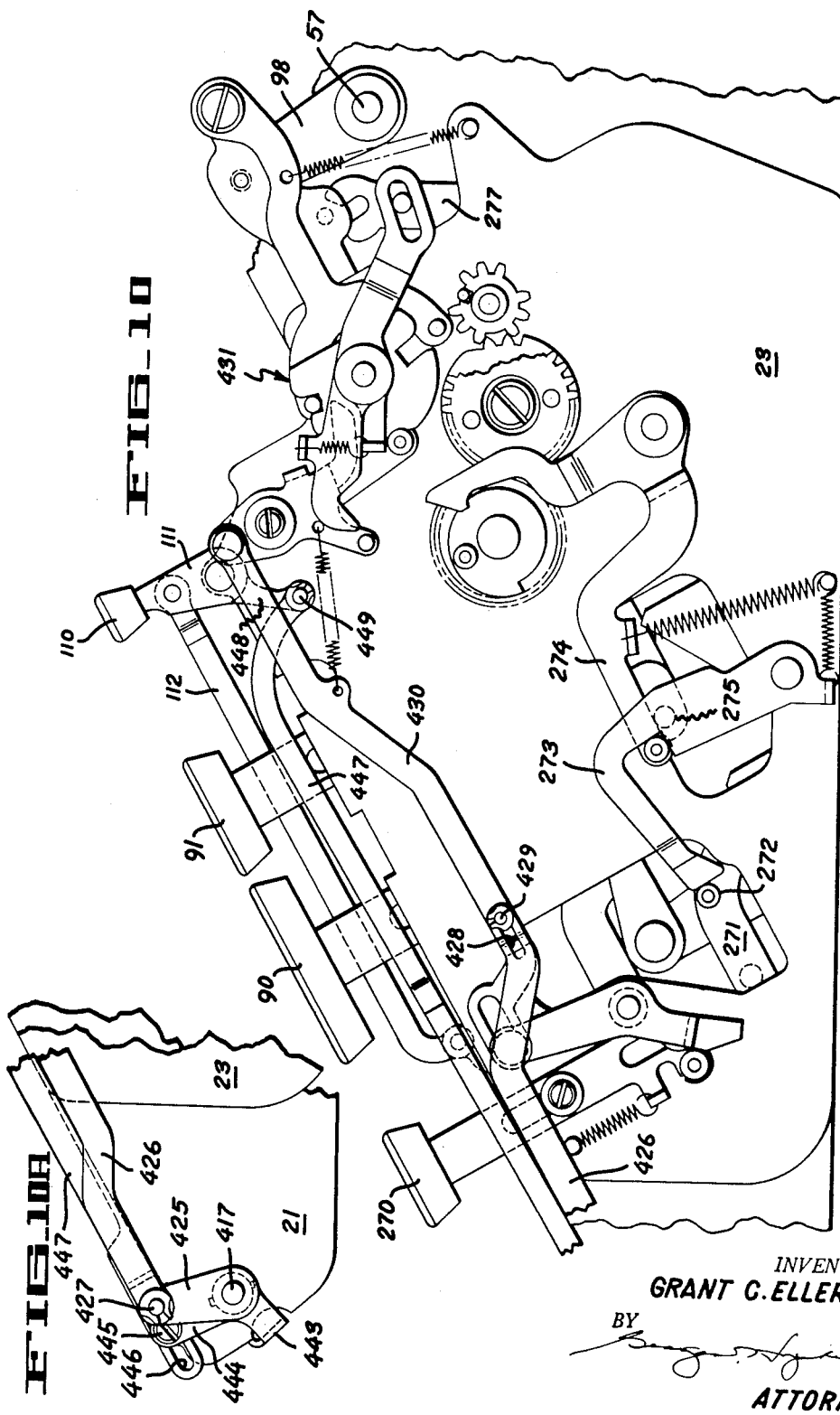
INVENTOR.
GRANT C. ELLERBECK
BY
ATTORNEY

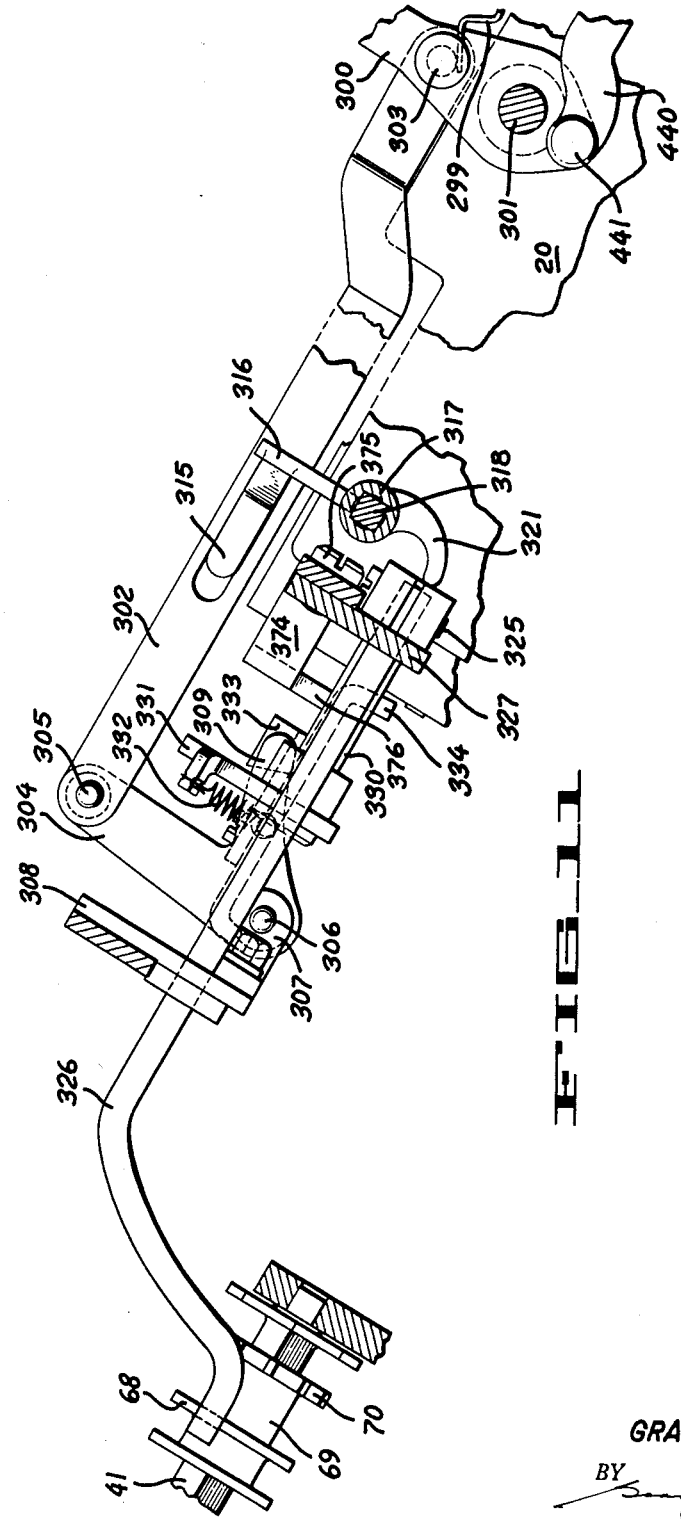

Feb. 28, 1956 G. C. ELLERBECK 2,736,492
SQUARE ROOT MECHANISM
Filed Feb. 8, 1951 11 Sheets-Sheet 11
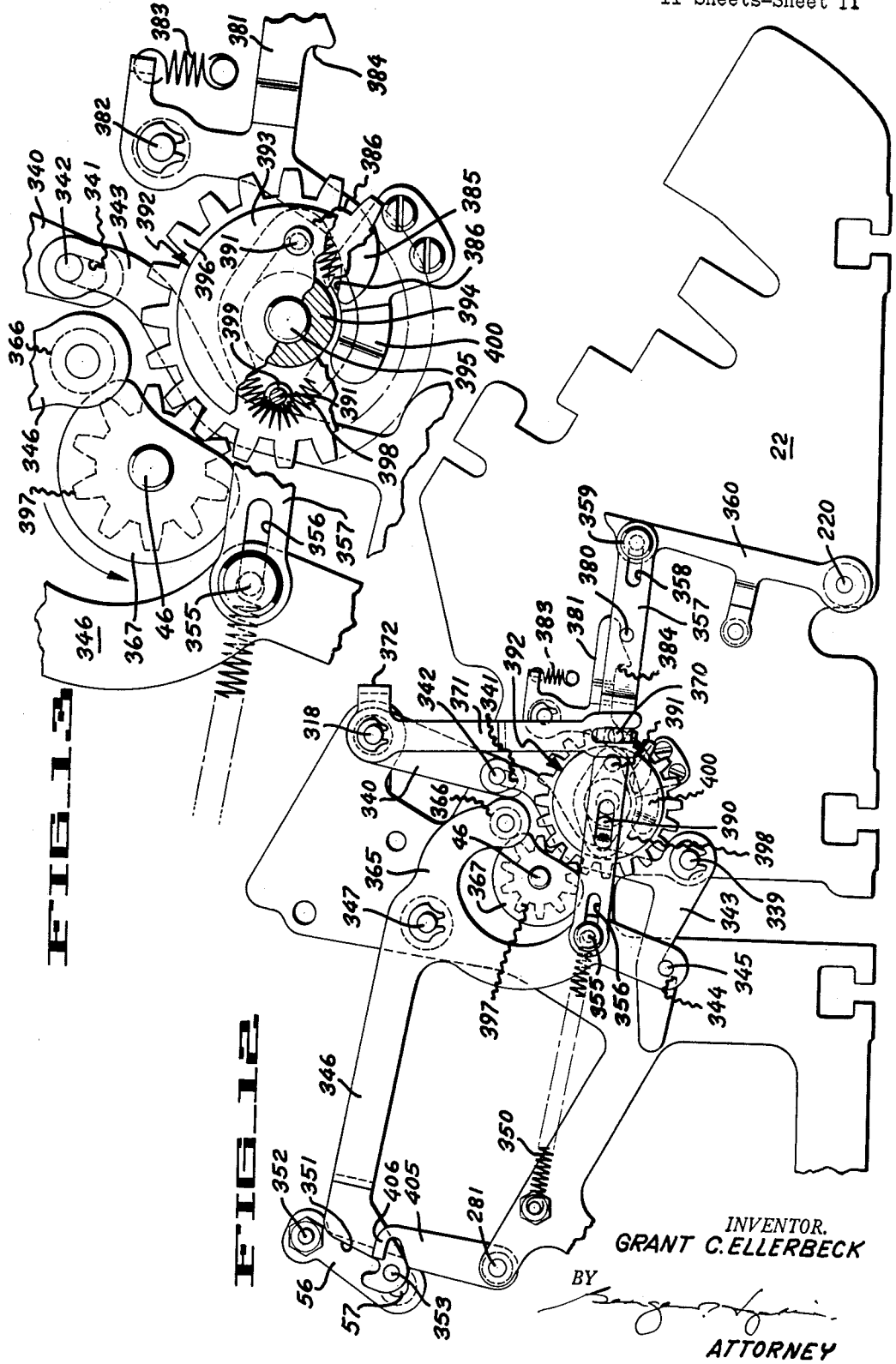
INVENTOR.
GRANT C. ELLERBECK
BY
ATTORNEY

United States Patent Office 2,736,492
Patented Feb. 28, 1956

2,736,492

SQUARE ROOT MECHANISM

Grant C. Ellerbeck, San Leandro, Calif., assignor to Friden Calculating Machine Co., Inc., a corporation of California Application February 8, 1951, Serial No. 210,079

21 Claims. (Cl. 235—63)

This invention relates to calculating machines and particularly to one which, in addition to performing the usual four calculations of addition, subtraction, multiplication and division, will extract the square root of a number contained in the accumulator register in a convenient and accurate manner.

The primary object of this invention is to provide a calculating machine capable of extracting square root of any given number in a semi-automatic manner.

Another object of this invention is to provide a control mechanism which when set to operative position will automatically limit the machine to a single cycle of operation without clearing the keyboard, and, when an overdraft occurs, to lock the keyboard against change and automatically initiate the sequential operation of first adding back the factor that caused the overdraft and then shifting the carriage one order to the left, after which the keyboard is unlocked.

Square root can be extracted in a calculating machine such as the well-known "Friden automatic calculator." Heretofore, such extraction required a rather long and complicated process, which required considerable skill on the part of the operator and also strict attention to the work being done as the possibility of error was great. When using a calculating machine, the extraction of square root is performed by the successive subtractions of odd numbers from the original number. Essentially this is one method of performing square root by hand. This process is based upon the fact that the square of the consecutive numbers is always the sum of the equal number of odd numbers added in their consecutive order. This is illustrated by the following table:

| Consecutive Numbers | Odd Numbers | Sum of Odd Numbers in Consecutive Order |
|---|---|---|
| 1 | 1 | 1 |
| 2 | 3 | 4 |
| 3 | 5 | 9 |
| 4 | 7 | 16 |
| 5 | 9 | 25 |
| 6 | 11 | 36 |
| 7 | 13 | 49 |
| 8 | 15 | 64 |
| 9 | 17 | 81 |
| 10 | 19 | 100 |
| etc. | etc. | etc. |

The normal manual method of extracting square root provides certain short cuts by working from the left side of the number. However, this theory, or rule for the extraction of square root can be applied to a calculating machine. As an example, the extraction of square root on the commercial Friden Automatic Calculating Machine, such as described in U. S. Patent No. 2,229,889, will be described:

1. The machine is conditioned for extracting the square root by having the carriage at its extreme right-hand position, the counter-control mechanism is set to actuate the counter in an unlike sign character with respect to the actuator (the counter counts positively during subtractive operations), and the automatic keyboard clearing mechanism is disabled.

2. The number is entered in the upper left hand dials, with the left-hand digit directly over the left-hand column of keys. This can be done through the keyboard in the usual manner, or by entering the value directly into the accumulator register by means of the conventional twirlers placed on the dial shafts.

3. The decimal point marker in the counter, or quotient register, is then placed in its proper position. This is determined by setting off the number in groups of two, as is done in manual square root extraction, and the decimal point moved one place to the right for each group of two in the number.

4. Starting in the column under the right-hand figure of the leftmost group of numbers (i. e., under the leftmost digit if the leftmost group has only one number, or under the second from the leftmost digit if the leftmost group has two digits) the value of "1" is subtracted. Next, the consecutive odd numbers 3, 5, 7, 9, 11, etc. are subtracted in order until the amount on the keyboard reaches the point where the next odd number cannot be subtracted from the left-hand group.

5. Raise the last odd number to the next higher even number and shift the carriage one order to the left. In the event the last odd number should be "9," then "1" is inserted in the next higher order and the "9" is erased, thereby making the value "10" in place of the "9."

6. In the first order to the right of the keys previously depressed, start subtracting the consecutive odd numbers 1, 3, 5, 7, 9, 11, etc., until the next odd number cannot be subtracted. When the value of "9" is passed, the value in the next higher order is raised by "1."

7. Again, when the keyboard value reaches the point where it can no longer be subtracted from the left-hand group, the last odd number to the right is raised to the next higher even number and the carriage is shifted one order to the left.

This process of subtractions of consecutive odd numbers and shifting of the carriage to the left is repeated until the square root has been extracted. As a practical matter, when the process has been carried through five orders of the answer, the division key may be depressed and a regular division operation initiated. In other words, when the normal ten-order keyboard is considered, the extraction of the square root through the first five places in the counter, counting from the left, is sufficient for all practical purposes. If regular division is initiated after this point has been reached, the answer is correct through all the orders above the first and usually is correct in the lowest or right-hand order. When errors do occur, it will be limited to the digit in the right-hand counter, which error becomes insignificant in a nine- or ten-order answer.

An example of the extraction of square root is given below, using as an example the factor of 390937.5625:

| Step | Keyboard Value | Accumulator Dial Reading | Counter Dial Reading |
|---|---|---|---|
| 1. Insert factor into accumulator. | | 390937.5625 | (to be clear) |
| 2. Place decimal point in counter dials, 3 places to right of left side of counter. | | | |
| 3. Subtract | 010000.0000 | 380937.5625 | 100.0000000 |
| 4. Subtract | 3 | 350937.5625 | 200. |
| 5. Subtract | 5 | 300937.5625 | 300. |
| 6. Subtract | 7 | 230937.5625 | 400. |
| 7. Subtract | 9 | 140937.5625 | 500. |
| 8. Subtract | 11 | 030937.5625 | 600. |
| 9. Raise 11 to 12 | | | |
| 10. Shift carriage one space to left. | | *30937.56250 | |
| 11. Subtract | (12)1000.0000 | 18837.56250 | 610. |
| 12. Subtract | (12)3 | 06537.56250 | 620. |
| 13. Raise | (12)3 to (12)4 | | |
| 14. Shift carriage 1 space to left. | | *6537.562500 | |
| 15. Subtract | (124)100.0000 | 5296.562500 | 621. |
| 16. Subtract | (124)3 | 4053.562500 | 622. |
| 17. Subtract | (124)5 | 2808.562500 | 623. |
| 18. Subtract | (124)7 | 1561.562500 | 624. |
| 19. Subtract | (124)9 | 0312.562500 | 625. |
| 20. Raise | (124)9 to (12)50 | | |
| 21. Shift carriage 1 space to left. | | *312.5625000 | |
| 22. Subtract | (1250)1 | 187.5525000 | 625.1 |
| 23. Subtract | (1250)3 | 062.5225000 | 625.2 |
| 24. Raise | (1250)3 to (1250)4 | | |
| 25. Shift carriage 1 space to left. | | *62.52250000 | |
| 26. Subtract | (12504)1 | 50.01840000 | 625.21 |
| 27. Subtract | (12504)3 | 37.51410000 | 625.22 |
| 28. Subtract | (12504)5 | 25.00960000 | 625.23 |
| 29. Subtract | (12504)7 | 12.50490000 | 625.24 |
| 30. Subtract | (12504)9 | 00.00000000 | 625.25 |

\* Indicates values in accumulator dials above keyboard after a carriage shift.
() Indicates numbers in the keyboard to the left of the order in which values are being manually changed.

It will be understood that as far as the mechanics of extracting square root is concerned, the steps under paragraphs 4 to 9 above may be modified by subtracting the consecutive odd numbers until an overdraft occurs, which is signalled in the Friden machine by the ringing of a bell. Thereupon the last value subtracted is added to the remainder in a single additive corrective cycle, and the value then standing on the keyboard is reduced to the next lower even number and the carriage is shifted to the left, and the process repeated. For example, instead of step 9 in the above table, the steps would be:

| | | | |
|---|---|---|---|
| 9a. Subtract 13 | | 900937.5625 (bell) | 700 |
| b. Add 13 | | 030937.5625 (bell) | 600 |
| c. Reduce 13 to 12 | | | |

The same procedure would occur in steps 13, 20, and 24. However, it is apparent that with such a procedure the result is the same. This method permits the operator to disregard values in the accumulator, so that operation will be approximately twice as fast as that outlined. The first method is generally used by operators as it is simpler to understand.

This alternative process is mentioned at this point as mechanically it is usually more convenient to sense an overdraft than it is to sense the difference between the value standing on the keyboard and that standing in the register. The latter method is therefore used in the present machine for extracting square root, although in some machines the first described method would also be satisfactory.

A further object of the present invention is to provide a fool-proof mechanism by which square root can be extracted quickly and accurately, without regard to the many mental steps required in the conventional extraction of square root in calculating machines.

Still another object of the present invention is to provide a mechanism suitably designed to facilitate the placing of the decimal point of an answer, during the extraction of square root.

My invention is directed to doing, in an automatic manner, the sequence of steps of sensing an overdraft, initiating a corrective additive cycle, and initiating a single left shift of the carriage (steps 9a, 9b, and 10 described above) to the end that the square root of the value placed in the register may be more rapidly and accurately secured.

In the machine of my invention the extraction of square root is simplified by providing a mechanism for sensing the overdraft, which mechanism is operable, first, to lock the keyboard against change, then initiate a single additive corrective cycle of the actuator and finally to shift the carriage a single step to the left. Coupled with this mechanism I prefer to provide a manually controlled means for conditioning the machine for an extraction of square root. This conditioning means, preferably, will also set the counter-control to count in a sign opposite to that of the accumulator (to count positively in subtractive operations), and to set a mechanism limiting the actuator to a single cycle of operation, without releasing the keyboard values. By this means the operator, after inserting the number in the accumulator, can direct his attention solely to the subtraction of successive odd numbers, and when a selection causes an overdraft, the machine operates automatically to lock the keyboard against further change, cause the initiation of the corrective additive cycle and the shifting of the carriage. Thereupon, the operator can reduce the number standing on the keyboard to the next lower even number and continue the subtraction of successive odd numbers in the next order to the right. Such a process not only expedites the extraction of square root considerably, but it also makes the operation substantially foolproof.

These and further objects of the invention will be apparent from the description of the machine which follows. The mechanism of my invention will be readily understood by reference to the drawings in which:

Fig. 1 is a plan view of the left-hand side of the machine of my invention, with cover, carriage, and certain unrelated parts removed.

Fig. 2 is a plan view of the right-hand side of the machine of my invention, with cover, carriage, and certain parts removed.

Fig. 3 is a cross-sectional view through the actuating portion of the machine of my invention, such as taken along the longitudinal vertical plane indicated by the line 3—3 of Fig. 1.

Fig. 4 is a sectional plan view showing particularly the carriage shifting mechanism.

Fig. 5 is a left side view of the mechanism controlling the automatic, single step shift of the carriage.

Fig. 6 is a right side view of the mechanism shown in Fig. 5.

Fig. 7 is a left side view of the right-hand frame plate showing particularly the single cycle and keyboard clearing mechanisms, such as taken along the longitudinal vertical plane indicated by the line 7—7 of Fig. 2.

Fig. 8 is a right side view of the right-hand frame plate, such as taken along the longitudinal vertical plane indicated by the line 8—8 in Fig. 2, and showing particularly the single cycle and keyboard clearing mechanisms.

Fig. 9 is a left-hand view of the right-hand auxiliary, or control, plate, such as taken along the longitudinal vertical plane indicated by the line 9—9 of Fig. 2, showing particularly the division control mechanism.

Figs. 10 and 10A are a right side view of the machine, such as taken along the longitudinal vertical plane indicated by the line 10—10 of Fig. 2, showing particularly further details of the keyboard clear and single cycle and division control mechanisms.

Fig. 11 is an enlarged cross-sectional view taken on a longitudinal vertical plane intermediate the left-hand frame, or supporting, plate and the left side auxiliary plate, looking toward the right, such as along a plane indicated by the line 11—11 of Fig. 1.

Fig. 12 is a left side view taken on a longitudinal vertical plane to the left of the left-hand auxiliary, or control plate, such as along the plane indicated by the line 12—12 of Fig. 1.

Fig. 13 is an enlarged detail of a portion of the mechanism shown in Fig. 12.

*General description*

The present invention is shown as an improvement on a calculating machine of the type disclosed in U. S. Patent No. 2,229,889, issued to Carl M. F. Friden on January 28, 1941, which relates to an improved automatic calculating machine. It will be understood, however, that it can be applied to other types of calculating machines. It will be further understood that conventional mechanisms, such as the customary multiplying mechanism, are not shown nor described but ordinarily would be used in the same machine.

The calculating machine incorporating the present invention includes a main frame comprising the main supporting plates 20 and 21 and the auxiliary or control plates 22 and 23 (Figs. 1 and 2). The main operating mechanism of the machine is supported, for the most part, between the supporting plates 20 and 21, which plates are secured to a base not shown. These frame plates 20 and 21 are interconnected and braced by suitable cross-frame members, such as 24, 25 and 26 which are shown in cross-section in Fig. 3. Most of the control keys and their associated mechanisms are supported on the auxiliary, or control, plates 22 and 23.

An accumulator and revolutions counter carriage 30 (Fig. 3), is mounted for endwise shifting movement transversely of the frame. The carriage 30 has mounted therein a series of accumulator dials 35 and also a group of revolutions counter dials 80, both series of which are viewable through suitable openings provided in the cover 31 of the carriage. The carriage may be shifted by power in either direction across the machine by manipulation of conventional shift keys or automatically shifted to the left in division or square root.

Numerical values may be entered in the machine by depression of appropriate numeral keys 36 of a conventional amount keyboard, the keys in each ordinal row being releasable individually by depression of an ordinal clear key 34 (Figs. 1 and 2) situated at the forward end of each order of keys, or the simultaneous release of all of the keys may be accomplished by a conventional mechanism operating the clearing bail 141. The various values set up on the keyboard may be registered additively or subtractively on the accumulator wheels 35 by the depression of a plus key 90 or a minus key 91, respectively (Fig. 9). If it is desired that the keyboard be cleared after each registration of a number in the accumulator, an add key 110 may be rocked forward and latched down in the well-known manner.

The accumulator dials 35 and the revolutions counter dials 80 may be cleared, or reset to zero, by manipulation of conventional mechanisms. As these mechanisms are conventional, they need not be described here.

The machine is adapted to perform automatic division operations by manipulation of a division key 270 (Fig. 9) which controls a division mechanism similar to the type described in U. S. Patent No. 2,327,981 to Carl M. F. Friden, issued August 31, 1943.

*Selecting and actuating mechanism*

The values to be entered into the accumulator dials, or wheels, 35 may be determined by means of a plurality of similar selecting mechanisms associated with the amount keys 36. As shown in Fig. 3, each ordinal row of amount keys cooperates with a pair of similar value selecting slides 37, 38 which are mounted for endwise movement by suitable well known means. As is well known in the Friden machine, the selecting slide 38 serves the "1" to "5" keys, and the selecting slide 37 serves the "6" to "9" keys.

Each selecting slide 37 carries a yoke at its rear end which embraces an annular slot in the hub of a ten-tooth selection gear 39 and selecting slide 38 is similarly connected to selection gear 40. Both gears are slidably and non-rotatably mounted on a longitudinally extending square shaft 41 journalled in the crossbars 24, 25 and 26. Hence, the longitudinal movement of the slides 37 and 38, as differentially controlled by the numeral keys 36, serves to position the selecting gears 39 or 40 in the path of a series of stepped teeth provided on an actuating cylinder, or mutilated drum 42, secured to a shaft 43 journalled between the crossbar 24 and a transverse supporting bar 28. For each adjacent pair of key orders there is provided one longitudinally extending actuator shaft 43 bearing a pair of actuating cylinders 42. Each actuator shaft 43 is provided at its forward end with a bevel gear 44 which meshes with a corresponding bevel gear 45 secured to a transverse power shaft 46 journalled between the side frames 20, 21 of the machine. The shaft 46 is cyclically and uni-directionally operated by means of a clutch controlled driving means, shown in part in Fig. 8, but fully shown and described in Friden Patent No. 2,229,889, and well known to those familiar with the Friden calculating machine so as to provide a single path of power flow from the electric driving motor to the various power operated mechanisms of the machine.

Each of the square shafts 41 is provided on its rear end with a slidably but non-rotatably mounted spool 50 which is provided with an integral ten-tooth add gear 51 and a ten-tooth subtract gear 52, which gears are adapted to cooperate with similar ten-tooth gears 53 secured on the lower ends of accumulator numeral wheel shafts 54.

When the machine is in its idle, or full cycle, position, the accumulator gears 53 lie midway between the add and subtract gears 51 and 52 so as to permit lateral shifting movement of the carriage. The gears 53, in this case, are free to pass through the space existing between the gears 51 and 52.

In order to enable an amount set up on the keys 36 to be added into the accumulator wheels 35, the spools 50 and integral gears 51 and 52 may be shifted toward the rear of the machine so as to engage the add gears 51 with the accumulator gears 53. This shifting of the gears is accomplished by means of a flat bar, or gate 55 extending transversely of the machine and lying within the space provided between the add-subtract gears 51, 52. The gate 55 is supported at either end by a pair of similar arms 56 secured to a transverse gate shaft 57 journalled between the side frames 20 and 21. The shaft 57 may be rocked clockwise as viewed in Fig. 3 in a manner hereinafter to be described so as to cause engagement of the add gears 51 with the accumulator gears 53 or alternatively, the shaft 57 may be rocked counter-clockwise so as to result in engagement of the subtract gears 52 with the accumulator gears 53.

*Tens-transfer mechanism*

Secured to the lower end of each of the numeral wheel shafts 54 is a single tooth tens-transfer cam 65 which is adapted to cooperate with a transfer lever 66 suitably journalled in the main carriage frame bar 32. On the outer end of the transfer lever 66 there is provided a down-turned ear 67 which lies between a pair of flanges 68 provided on the hub 69 of a tens-transfer gear 70 located in the next higher order of the machine. The hub 69 and gear 70 are slidably, but non-rotatably, the gear 70 will be transmitted through the add-subtract gears 51, 52 to the numeral wheel shaft 54. Whenever the accumulator wheel 35 passes from "0" to "9" or from "9" to "0," the single tooth on the transfer cam 65 will rock the transfer lever 66 and move the ear 67 forwardly so as to move the transfer gear 70 into the path of a single, transfer actuating, tooth formed on a disc 71 secured to the drum shaft 43. The single tooth will thereby cause one step of movement to be given to the square shaft 41 in addition to the normal movement imparted thereto by the actuating cylinder 42. The accumulator wheel 35 will thus be advanced one step so as to effect the transfer between one order and the next higher order, as required.

After the tens-transfer has been effected, the transfer gear 70 will be restored to its normal position by means of a restoring cam 72 secured to the actuator shaft 43. This restoring cam operates on the forward end of a detent pin 73 which is mounted for sliding movement in the crossbar 28 and in a transverse supporting bar 74. The pin 73 carries a pair of spaced flanges 75 which embrace one of the flanges 68 provided on the hub 69 of the transfer gear 70, so that when the pin 73 is cammed rearwardly, the gear 70 will be restored to its normal position.

Revolutions counter

As shown in Fig. 3, each of the revolutions counter numeral wheels 80 is secured to a longitudinally extending shaft 81 journalled at its rear end in the carriage frame bar 32 and at its forward end in a channel bar 82 which forms a part of the frame work of the carriage 30. Secured to each of the shafts 81 is a gear 83 which is arranged to cooperate with a revolutions counter actuating mechanism 84 for operating the numeral wheels 80 in such a manner as to provide a count of the cyclic operations of the calculating machine and also for causing a unit to be transferred from a lower order to a higher order each time a wheel 80 passes through zero.

The revolutions counter mechanism is fully shown and described in the above-mentioned Patent 2,229,889, to which reference may be had for a more complete disclosure of this part of the machine. Further, the counter mechanism may be set at the will of the operator for either like or unlike actuation with respect to the accumulator, by a suitable mechanism such as that shown in the Friden Patent 2,294,111. This control mechanism is shown in Fig. 10 and indicated generally by the reference character 431.

Actuator drive and control

In order to effect registration in the accumulator of the value set up on the amount keys 36, the actuator shafts 43 are operated in a cyclic fashion by means of a clutch controlled drive from an electric motor of the machine, not shown. As shown in Fig. 8, the armature shaft 160 of the motor has secured thereto a pinion 161 which meshes with an idler gear 162 which in turn meshes with a large gear 163 rotatably mounted on the transverse power shaft 46. The gear 163 forms the driving element of a clutch, indicated generally at 165, such as shown and described in Friden Patent No. 2,229,889. The clutch per se forms no part of the invention, so its construction will not be described. It should suffice to mention that engagement and disengagement of the clutch is controlled by a pawl, or dog 164, rocked by link 106. The link 106 is pivotally mounted at its rear end (Fig. 8) on the clutch pawl 164, and its forward end is also pivotally mounted, as by pin 105, to the upper end of lever 107. The lever 107 is pivoted to the supporting frame 21 by any suitable means, such as screw 108, and an extension 466 thereof controls the opening and closing of the motor switch (not shown) in a well-known manner. Also pinned to the lever 107, by pin 105, is a clutch control link 104 which operates the clutch and motor switch, and is also used to limit operation to a single cycle when necessary.

An example of actuator control will be given in connection with the operation of the plus-minus keys to control additive and subtractive cycles of operation. This mechanism is shown particularly in Fig. 9. It will be observed that the plus key 90 and the minus key 91 are both slidably mounted on the control plate 23. The keys 90 and 91 are provided with roller studs 92 and 93, respectively, which cooperate with oppositely inclined cam faces 94 and 95, respectively, provided on a gate setting slide 96. This slide is pivotally connected at either end to the upper ends of arms 97 and 98, the forward arm 97 being pivoted on the control plate 23 while the arm 98 is secured to the right-hand end of the gate shaft 57. Hence, when the plus key 90 is depressed, the slide 96 will be moved rearwardly so as to rotate the gate shaft in a counter-clockwise direction, as viewed in Fig. 9 (clockwise in Fig. 3), thereby causing the add gears 51 to be engaged with the accumulator gears 53 on the numeral wheel shafts 54. In a similar manner, depression of the minus key 91 will cause forward movement of the slide 96, thereby rocking the gate shaft 57 counter-clockwise in Fig. 3 so as to engage the subtract gears 52 with the accumulator gears 53.

In order to initiate operation of the drive mechanism of the machine when either key 90 or 91 is depressed, each of these keys is provided with a half-round stud 100 which is adapted to cooperate with a cam face 101 provided on a cycle-initiating slide 102. The forward end of this slide carries a stud 103, which extends through an appropriate slot in the supporting plate 23, where it is embraced by a slot 109 in the link 104 to engage the clutch and close the switch controlling the flow of power to the motor. This will cause the electric driving motor of the machine to be energized and the power shaft 46 to be rotated, thereby driving the actuator shafts 43 to which are secured the actuating drums 42. Hence, the amount set on the keys 36 will be run into the accumulator wheels 35 in either a positive or negative direction depending on which of the keys 90 or 91 is depressed.

Single cycle and keyboard clear

It is conventional in calculating machines of this kind to provide an "add" key which is operative, when set to proper position, to limit the machine operation to a single cycle even though a control key is held depressed, and to automatically release the keyboard setting toward the end of the single cycle of operation. It is necessary in my machine to disable such keyboard clearing mechanism, as will be evident by a reference to the outline of steps above given, for it is necessary to retain a keyboard value at all times. However, it is highly desirable, although not absolutely essential, to limit operation to a single cycle. The conventional single cycle, or "add" key mechanism will now be described, leaving to a later point the superseding controls set by the square root conditioning mechanism.

The normal operation of the automatic single cycle and keyboard clear mechanisms are under the control of the "add" key 110 (Figs. 9 and 10). In the preferred form of machine, the add key 110 is mounted on the upper end of lever 111 pivotally mounted on the auxiliary plate 23. The upper end of lever 111 is connected by a link 112 to a long pin 113 mounted on a bellcrank 114 (Figs. 7 and 8), which bellcrank is mounted on main plate 21. Referring to Fig. 7, when the key 110 is rocked forwardly it rocks bellcrank 114 clockwise, depressing slide 115. Depression of slide 115, by means of a pin and slot connection 116 with a long link 117, lowers the front end of the link 117. The link is urged forwardly by spring 125, but is normally cammed rearwardly by engagement of a cam face 118 thereon with a roller 119 on the frame. Thus, as the link is lowered it moves forwardly into operative position. The downward and forward movement results in engaging a notch 120 in the link 117 which a pin 130, the purpose of which will be presently described. When the link 117 moves forwardly it rocks the foot of a lever 121 pivoted at 122 on plate 21 into the path of a pin 123 secured to a disc 124 on the main drive shaft 46. As the drive shaft 46 rotates (counter-clockwise in Fig. 7) the pin 123 rocks the lever 121 near the end of the cycle and this causes the link 117 to draw the pin 130 rearwardly.

The pin 130 (as shown in Fig. 8) is secured to a bell-crank 131 pivoted at 132 to the side frame 21. Pivotally mounted at 133 on the bellcrank 131 is an arm 134 which has a lip 135 on its front edge which is adapted to engage a live extension 140 (see Fig. 2) on the bail 141. The live extension 140 is resiliently held to the bail 141 by a suitable tension spring 143 (Fig. 7). Normally, reciprocation of link 134 will rock bail 141—the bail and live extension operating as a single member. However, bail 141 can be locked against operation and the spring will permit the live tip 140 to operate as before. The bail operates ordinal latch slides 142 (Fig. 3) to release the keys of the keyboard in a conventional manner.

The rocking of the bellcrank 131 also disengages the clutch and opens the motor switch, thereby stopping the machine after a single cycle of operation even though the plus or minus key is held depressed for a longer period. An arm 150 (Fig. 7) is pivotally mounted on the left side of the supporting plate 21 by any suitable means such as on stud 151 which also guides the slide 115. The arm 150 is extended to lie adjacent a second arm 152 which is pivotally mounted on the plate 21 by any suitable means, such as pin 153. The second arm 152 carries a pin 154 which engages the slot 155 in the forward end of the link 104 (see Fig. 8). Thus, as the long link 117 is rocked sharply (to the left in Fig. 7) toward the end of a cycle of operation, the pin 130 and bellcrank 131 are also rocked rearwardly. The pin 130 engages the arm 150 in such rocking, thereby rocking it counter-clockwise. The upper end of arm 150 engages the second arm 152, thereby rocking it clockwise about its pivot point 153. Rocking of the arm 152 and its pin 154 lifts ethe forward end of the link 104, so that the slot 109 in link 104 becomes disengaged from the pin 103 on the plus-minus slide 102. The link 104, being disengaged from the pin 103, can then spring forwardly under the tension of its spring 156. The forward motion of link 104 rocks the arm 107 to open the motor switch and pulls the link 106 and clutch pawl 107 to open the clutch. Thus, when the "add" key is rocked forwardly, the machine automatically stops operation after a single cycle even though the control keys are held depressed, and also normally clears the keyboard by rocking the clearing bail 141.

*Carriage shift mechanism*

Means are provided for shifting the carriage selectively in either direction through one or more ordinal spaces and the shifting means is preferably operated from the actuator shafts 43 under the control of conventional manually derpressible shift keys, not shown, but fully shown and described in U. S. Patent No. 2,380,642 issued to Carl M. Friden et al. on July 31, 1945. The shift keys carry studs which cooperate, respectively, with a left shift arm 170 and a right shift arm 171 (Fig. 4) and cause the arms to be rocked when the keys are depressed. As will later be described, rocking of these arms will cause either the left shift clutch or the right shift clutch to be engaged and thereby determine shifting of the carriage in one direction or the other. As disclosed in the patent, suitable connections are also provided between the shift keys and the lever 107 (Fig. 8) which will cause this lever to be rocked clockwise upon depression of either of the shift keys to thereby initiate cyclic operation of the actuator shafts 66 so as to provide the power drive for the shift mechanism.

Referring again to Fig. 4, it will be observed that the arm 170 is pinned to a transverse shaft 172 which is journalled between the right side frame 21 and a bracket 173 secured to the crossbar 24. Also pinned to the shaft 172 is an arm 174 to which is pivotally connected a pusher link 175 which is notched at its rear end so as to engage with the forward end of a left shift push rod 176 which is mounted for longitudinal sliding movement in the machine. The rear end of the link 175 is normally urged downwardly so as to engage the notch in the link with the forward end of the rod 176 by means of a spring 177.

In a like manner, the arm 171 is secured to the right-hand end of a sleeve 180 to the left-hand end of which is secured an arm 181 similar to the previously mentioned arm 174. Pivotally connected to the arm 181 is a pusher link 182 which, like the link 175, is notched at its rearward end so as to engage the forward end of a right shift push rod 183 which is slidably mounted within the framework of the machine. The notch in the pusher link 182 is normally maintained in engagement with the forward end of the push rod 183 by means of a spring 184. The push rods 176 and 183 are normally maintained in their forward or inactive positions as shown in Fig. 4 by means of compression springs 178 and 185, respectively. The rear ends of the push rods carry shifting forks 179 and 186, respectively, which engage annular grooves cut in clutch members 190 and 191, respectively. The members 190, 191 are loosely journalled on the rear ends of the two rightmost actuator shafts 43a and 43b, and are provided with clutch teeth 192 and 193 which engage with corresponding notches provided in collars 194 and 195 secured to the rear ends of the extended actuator shafts 43a and 43b. The clutch members 190 and 191 are also provided on their rear ends with clutch teeth 196 and 197 which are adapted to cooperate with clutch teeth 198 and 199 formed on the forward ends of gear sleeves 200 and 201 when either the member 190 or the member 191 is moved rearwardly by its associated shift fork 179 or 186. Hence, it will be seen that the coupling members 190 and 191 provide a means whereby the extended actuator shafts 43a and 43b may be selectively coupled to the gear sleeves 200 or 201 and thereby provide a power drive for the carriage shift mechanism. Hence, upon depression of the left shift key the arm 170 will be rocked and the pusher link 175 moved rearwardly so as to move the push rod 176 and the shift fork 179 toward the rear of the machine and thereby cause the coupling member 190 to establish a driving connection from the actuator shaft 43a to the gear sleeve 200. In a similar manner, when the right shift key is depressed, the arm 171 will be rocked and the pusher link 182 moved rearwardly so as to operate the push rod 183 and shift fork 186 and establish a driving connection between the rightmost actuator shaft 43b and the gear sleeve 201.

As seen in Fig. 4, the gear sleeve 200 carries a gear 202 which meshes directly with a larger gear 204 to which is secured a smaller gear (not shown) which meshes with a shift gear 205. The gear sleeve 201 carries a gear 203 which meshes with a wide idler gear (not shown) which meshes with the large gear 204 and causes reverse rotation of this gear. The gear sizes are so chosen as to provide a drive ratio of "1" to "4" between the gears 202 and 203 and the shift gear 205, so that for each rotation of the gear sleeve 200 or 201, the shift gear 205 will be rotated through an angle of 90 degrees.

The shift gear 205 is secured to a shaft 206 which is journalled between the crossbar 26 and a plate 207 mounted on the rear of the machine. Secured to the shaft 206 is a drive plate 210 which carries four equally spaced drive pins 211 which are adapted to engage notches 212 (Fig. 3) provided in a shift rack 213 secured on the rear of the carriage 30. Hence, for each 90 degrees of rotation of the drive plate 210 the carriage will be shifted through a distance equal to the spacing between the notches 212, which is equal to the distance between the numeral wheel shafts 54. In other words, the carriage will be shifted one ordinal space on each cycle of operation of the power shaft 46.

It will be recalled that after the subtraction of successive odd numbers to an overdraft, it is necessary to restore the overdraft and shift the carriage one step to the left. In the commercial Friden automatic calculating machine a power actuated carriage shift is included in the mechanism. This shift is particularly shown and described in the copending Machado application Ser. No. 164,765, filed May 27, 1950, now Patent No. 2,650,761, issued September 1, 1953. The mechanism so described in the Machado application can be efficiently utilized to control my single step left shift of the carriage. A pertinent part of the mechanism is shown particularly in Figs. 4, 5, and 6. The operation is controlled through rocking of a transverse shaft 220 which shaft is rocked in timed relation to the overdraft, as will be hereafter described.

A bellcrank 221 is pinned to the shaft 220, in a plane adjacent the left shift clutch push rod 176 (Fig. 4). The bellcrank 221 has a lower arm 222 which is provided with a stud 223 for unlatching the mechanism, as will be described shortly, and an upper arm 224 which is provided with a stud 225. The stud 225 is embraced in a slot 226 in one end of link 227, a spring 228 connecting stud 225 to the turned-over ear 229 on the adjacent end of the link 227. The other end of link 227 is pinned to an arm 235 of a hook member 236 by any suitable means. The hook member 236 is rotatably mounted on an eccentric 237 pinned to a shaft 238 which is driven synchronously with drive shaft 46. The hook member is provided with a second arm 239, the outer end of which is provided with a hook 240. It is thus obvious that the hook member 240 continuously reciprocates on its eccentric mounting in synchronism with the main drive shaft whenever the main clutch 165 is engaged and the motor is running.

A bellcrank 245 is pinned to a shaft 244 in a plane immediately adjacent to that of the hook 240. The upper arm 246 of the bellcrank is provided with a stud 247 which, when the hook member 240 is rocked rearwardly (clockwise in Fig. 6) through rocking of the shaft 220, will be engaged by the hook 240 during its continuous reciprocation. However, when the shaft 220 is in its normal setting, the counter-clockwise position shown in Fig. 6, the reciprocating hook 240 cannot engage the stud 247. When the hook 240 is rocked to its operative position (clockwise of that shown in Fig. 6) the hook, at its extreme upward travel will engage the stud 247 and thereupon will rock the bellcrank 245 and the shaft 244 clockwise. It will be understood that the hook 240 is effective to pull bellcrank 245 and shaft 244 clockwise only after the hook member 240 has been rocked clockwise on its eccentric, for otherwise the hook will not travel in a path which will bring it into engagement with stud 247.

The lower arm 248 of the bellcrank 245 is provided with a latching stud 249. Associated with the latching stud 249 is a latching member 250 pivotally mounted on a pin 251 supported by the bracket member 252. The latch 250 is pulled downwardly (counter-clockwise in Fig. 6) by a spring 253 tensioned between it and the bracket 252. The latch has a shoulder 254 adapted to engage the pin 249 on the arm 248, thereby latching the bellcrank 245 and shaft 244 in the operative position (clockwise of that shown in Fig. 6), thus locking the shaft in its clutch-engaging position. The latch member 250 is also provided with extension 255 which is engaged by the pin 223 on the bellcrank 221 when the bellcrank and its shaft 200 are rocked in a forward direction (counter-clockwise in Fig. 6), thereby unlatching the latch 250 and releasing the shaft 244 for counter-clockwise rotation. As the bellcrank 245 is locked in its rocked position by the latch 250, at the end of the clockwise rocking of the eccentrically mounted hook 240, the hook thereafter reciprocates freely without thereafter rocking the bellcrank 245 and shaft 244. Thus rocking of the shaft 220 results in the shaft 244 being rocked to its operative position.

Rocking of the shaft 244 causes engagement of the left shift clutch, in the second cycle of machine operation, as will now be explained. Referring still to Figs. 4, 5, and 6, the shaft 244 has an arm 260 secured thereto, on which a pusher arm 261 is pivoted by any suitable means. The pusher arm 261 has a shoulder 262 engaging a pin 263 on an arm 264 which is secured to sleeve 265 rotatably mounted on shaft 172. Sleeve 265 also carries an arm 266 having a pin 267 thereon which engages the left shift push rod 176. This, it will be recalled, causes engagement of the left shift clutch 194 and causes the carriage to be shifted to the left. It will be understood that the left shift clutch is engaged in the second cycle of machine operation, as there must be an idle cycle before the hook 240 engages pin 247 to rock bellcrank 246 and shaft 244.

*Division control mechanism*

It was indicated early in the specification that for all practical purposes it was usually satisfactory to extract the square root for five or six orders from the left and then to initiate an ordinary division operation, as the answer would still be correct to nine significant figures. It is therefore assumed that the present invention will be used in a machine which utilizes an automatic division mechanism. One such mechanism is shown in Figs. 9 and 10, and will be recognized by those familiar with the Friden machine as being that used in the patents and applications above-mentioned. This mechanism operates in a conventional manner and need not be described herein, as a reference to the above-mentioned patents will fully explain this mechanism. The only connection that the division control mechanism has with the mechanism of the present invention is an interlock to disable the square root control mechanism when the division operation is initiated. Briefly, the depression of a division key 270 (Fig. 9) moves slide 271 rearwardly. A pin 272 on slide 271 (Fig. 10) rocks a latch member 273 counter-clockwise to release the spring-powered arm 274. The arm 274 rocks counterclockwise through the force of its spring to depress a pin 275 carried by link 276 (Fig. 9). Depression of the link 276 rocks the lever 277, to which the link is pinned, clockwise about its pivot point 278. The lever 277 carries a pin 279 adjacent its rearward end, which, when the arm 277 rocks clockwise, lifts the arm 280 which is rigidly secured on shaft 281, thereby rocking the shaft counter-clockwise in Fig. 9. The rocking of this shaft 281 is utilized to latch the square root mechanism, now to be described, in an inoperative position. Thus the square root control mechanism will not interfere with the operation of the machine in an ordinary division operation, after the division key 270 is depressed.

*Square root mechanism*

I prefer that the mechanism of my invention be conditioned for the extraction of square root by rocking of a lever 300 (Figs. 1 and 11) which is pivotally mounted on a cross shaft 301 extending between the left-hand supporting plate 20 and the left-hand auxiliary plate 22. The lever 300 can be held in either adjusted position by a suitable detent 299, as shown. In the form shown, the forward rocking of the lever does three things: (1) It sets a conditioning mechanism which is operated by an overdraft to initiate a corrective additive cycle of operation followed by a left shift of the carriage, during which operation the keyboard is locked against alteration; (2) it sets the counter-control mechanism to count the cycles of operation in an unlike manner with respect to the actuator, so that subtraction operations give a positive count in the counter; and (3) it operates the "add" key to condition the machine for a single cycle operation while disabling the automatic keyboard clear mechanism. These operations will be discussed in sequence.

1. *Overdraft correction and shift.*—A link 302 (Fig. 11) is pinned to the lever 300 by any suitable means, such as extended pin 303 (see also Fig. 1). The rearward end of the link 302 is supported by a bellcrank 304 to which it is pinned by any suitable means, such as rivet 305. The bellcrank 304 is pivotally mounted on a cross shaft 306 which is supported in suitable brackets 307 on a cross member 308. The bellcrank 304 has a forwardly extending arm 309, as shown in Figs. 3 and 11.

Integral with the link 302 is a cam portion 315, which may be stamped out of the link itself, as shown. Associated with the cam 315 is a pin 316 mounted in a sleeve 317 slidably but nonrotatably mounted on a square shaft 318 which extends from the left-hand plate 20 to the left-hand auxiliary plate 22. The sleeve 317 is normally urged toward the right side of the machine by a suitable spring 319 (Fig. 1) compressed between the sleeve 317 and a collar 320 pinned to the shaft. The sleeve 317 also carries a lower arm 321 which normally (as shown in Fig. 1) lies immediately to the right of a bar member 325. However, when the control lever 300 is rocked forwardly the link 302 is pulled forwardly, camming the sleeve 317 and integral arm 321 to the left so that it is engaged by the bar 325.

The bar 325 is mounted on a rod 326 which is slidably mounted in the cross plate 308 and in a bracket 327 affixed thereto. The rod 326 is extended rearwardly and bent to lie adjacent the flange 68 of a tens-transfer gear 70 in a predetermined order of the machine, such as the last, or highest, order shown in Fig. 1. As shown in Fig. 1, the rod 326 is slotted, as at 328, to embrace one of the flanges 68 whereby the rod 326 will be pushed forwardly upon the conditioning of a tens-transfer gear for a tens-transfer and will be pulled rearwardly upon the restoration of the tens-transfer gear by the cam 72. Movement of the rod 326 will obviously move the bar 325 which in turn rocks the arm 321 (see Fig. 11) to rock the shaft 318 (counter-clockwise in Fig. 11).

The bar 325 also carries a short rearwardly extending rod 330, as shown in Figs. 1 and 3. A lever arm 331 is pivotally mounted on the rear end of the rod 330, extending to the right in Fig. 1. The arm 331 overlies the forwardly extending arm 309 of the bellcrank 304 and is normally urged downwardly by a light spring 332 tensioned between the arms 331 and 309. When the control lever 300 is in its normal rearward position, the arm 309 of the bellcrank lifts the arm 331 above an adjustable cam lock 333 adjustably mounted on the keyboard locking plate 334. The keyboard locking plate is pivotally mounted on the cross shaft 306, which plate is normally urged to a raised position by a suitable spring 335 (Fig. 2) tensioned between the locking plate 334 and the cross plate 308. When the control lever 300 is rocked to its forward position, rocking the bellcrank 304 clockwise in Fig. 11, the arm 331 is permitted to drop behind the cam plate 333. Thereafter upon an overdraft in the predetermined order, the forward movement of the rod 326, bar 325 and rod 330 cams the plate 334 downwardly so that the turned-over ear 336 on the forward edge thereof drops behind the rear end of the ordinal latching slides 142. This effectively prevents rearward movement of the key latching slides and locks the keyboard against change in any of the orders thereof.

Upon the restoration of the tens-transfer gear to its normal position, the rod 326 is pulled rearwardly and the arm 331 likewise moves rearwardly, which normally would release the latching plate 334. However, it is necessary that the keyboard values be retained until after the corrective and shifting cycles of operation so that I prefer to provide a second latch 374 which will hold the plate 334 in a depressed position until the shifting cycle has been partially completed. This latch, as shown in Fig. 1, is pivotally mounted at 375 on the bracket 327 and is operated by a mechanism which will be later described.

It will be recalled that when the control lever 300 is pulled to its operative or forward position an overdraft in the preselected order will cause a rocking of the shaft 318, counterclockwise in Fig. 11. This shaft extends through the left side auxiliary plate 22 and has an arm 340 rigidly secured thereto on the left side of the auxiliary plate (see Fig. 12). The free, or lower, end of the arm is provided with a slot 341 which embraces a pin 342 on the upper arm of a bellcrank latch lever 343. The latch member 343 is pivoted on the auxiliary plate 22 as at 339, and is provided with a shoulder 344 adapted to engage a pin 345 on a power lever 346 pivoted on the auxiliary plate 22 by any suitable means such as stud 347.

The lever 346 is urged in a clockwise direction by a relatively strong spring 350. At its rear end the lever 346 is provided with a cam edge 351 which, when the plus-minus gate 55 is in its neutral position, is adapted to engage a stud 352 on the left end of the gate and rock the gate rearwardly to its positive position. It will be recalled that at the end of either an additive or a subtractive cycle of operation, when operating under the control of the plus or minus keys, respectively, the gate returns to its central or neutral position. This return to the central position occurs toward the end of the cycle, and when the latch 343 has been rocked clockwise to unlatch the lever 346, the cam edge will catch the stud 352 upon the return of the gate 55 to its neutral position and cam it to a positive position.

The lower arm of the power lever 346 is provided with a stud 355 which is embraced by a slot 356 in a forwardly extending link 357. The forward end of the link 357 is provided with a slot 358 which encompasses a pin 359 on the upper end of a lever 360 pinned to the shaft 220.

Rocking of the shaft 220 also causes the closing of the motor switch and the engagement of the main clutch. The mechanism for this is shown in Fig. 7. Mounted on the right-hand end of the shaft 220 is an arm 460 which carries a stud 461. The stud 461 engages a two-armed lever 462, pivotally mounted on the right-hand supporting plate 21 by any suitable means such as pin 463. The rearward end of the lever 462 is shaped to form a projection, or hook, 464 lying behind the spacing stud 465 which pivotally connects the arm 107 (Fig. 10) and arm 466 which operates the motor switch. Thus rocking of the shaft 220 (counter-clockwise in Fig. 7) rocks the lever 462 clockwise and pushes the spacing stud 465 forwardly, thereby rocking the connected arm 107 and link 466 to close the motor switch and rock the clutch pawl 164 to engage the clutch 165.

It may be mentioned at this point that the three-armed lever 346 has a forwardly extending arm 365 on the forward end of which is mounted a cam follower roller 366 which is adapted to cooperate with a plate cam 367 mounted on the left end of the drive shaft 46. This cam 367 is so shaped that it will permit a rapid rocking of the three-armed lever 346 upon disengagement of the latch 343, which will occur toward the end of the cycle at approximately the instant that the plus-minus setting gate 55 is starting to return to its neutral position. It is thus obvious that the overdraft in the predetermined order operates through shaft 318 to release the lever 346, which latter lever serves the twofold purpose of first setting the plus-minus setting gate 55 for additive operation and simultaneously rocks the shaft 220 which immediately closes the motor switch and engages the clutch and on the second cycle of operation will cause a left shift operation of the carriage. During the first cycle of such operation the value on the keyboard, which caused the overdraft, is locked in the keyboard as above described, and the additive cycle adds back the value which caused the overdraft, thus correcting the overdraft. The power lever 346 is restored to its normal position shown in Fig. 12 during the first cycle of machine operation after the overdraft—the cam 367 rocking the lever 346 counter-clockwise to release the pin 352 and to again engage the pin 345 within the shoulder 344 of latch 343. It will be understood that the correction of the overdraft in the first cycle of operation will return shaft 318 and consequently latch member 343 to their normal positions shown in Fig. 12, as the overdraft is corrected and the link 326 returned rearwardly in the conventional manner. It can also be mentioned that the release of the pin 352 by the arm 346 after the cycle has begun does not effect the adding back of the overdrafting value as it is conventional in machines of this kind to latch the digitation control mechanism in operative position until the end of the cycle.

The link 357 is provided with a stud 370 which is engaged by the slotted lower end of an arm 371 pivotally mounted on the shaft 318. The arm 371 has an integral bent-over gate 372, as is shown particularly in Fig. 1. The inner end of the gate 372 has an integrally formed arm 373 which is also pivotally mounted on the shaft 318. The rear end of the arm 373 underlies a locking arm 374 which is pivotally mounted on the bracket 327 by any suitable means such as screw 375. The right-hand end of the locking arm or lever 374 is bent as shown in Fig. 1 to overlie the end of the keyboard locking plate 334 and is provided with an ear 376 (see Fig. 3) which, when the left end of the lever 374 is raised by the rocking of the bail 372, locks the keyboard latching plate in its lower, or keyboard locking, position.

Thus, the keyboard latching plate 334 is held in its lower, or locking, position during the second cycle of operation, and after the overdraft has been restored (which returns the arm 331 to an inoperative position).

The link 357 also carries a second stud 380 which is adapted to cooperate with a three-armed latching lever 381. The latching lever 381 is pinned to the auxiliary plate 22 by any suitable means, such as stud 382, and is urged in a clockwise direction by a suitable spring 383 tensioned between one arm of the lever and a stud on the supporting plate (as is shown in Fig. 13). The forward arm of the lever is provided with a shoulder 384 which is adapted to engage the stud 380 and thus hold the link in its rearward position to which it is pulled by the rocking of the three-armed lever 346. The locking of the link 357 in its rearward position thus holds the lever 360 and shaft 220 in their counterclockwise position to maintain the motor in operation and the clutch engaged through a second cycle of operation. The third arm 385 of the latching lever 381 extends rearwardly and is operative to disengage the latch during the second cycle of operation by a means now to be described.

The link 357 is provided with a short cam 390 which either may be mounted on the link or stamped therefrom, as shown. This cam 390 cooperates with either of the pins 391 of a pin wheel assembly indicated generally at 392. The pin wheel comprises a plate 393 which is formed with an integral hub 394 rotatably mounted on a short shaft 395. Spaced slightly away from the plate 393 is a gear 396 preferably integral with the hub 394. It will be obvious that the plate 393, hub 394, and gear 396 can be formed of three separate parts suitably pinned together as well as being made integral as shown and described. The gear portion of the assembly meshes with a drive gear 397 rigidly secured to the drive shaft 46, the drive gear preferably being located between the auxiliary supporting plate 22 and the cam 367 as shown. The gear ratio between the driving gear 397 and the driven gear 396 is 1 to 2 in order to provide for 180° of rotation of the pin wheel assembly for each cycle of operation of the machine. This means that it will require two cycles of operation for a pin 391 to return to its home position. In this connection it can be noted that the cam 390 is relatively short so that, on the rearward motion of the link 357, the cam face of the cam 390 will engage the outer end of one of the pins 391, pushing it through the pin wheel assembly and pass beyond the pin so that upon rotation of the pin wheel the other pin will not engage the cam. The pins 391 are slidably mounted in the plate 393 and gear 396 and in their normal position extend to the left of the plate 393, as shown particularly in Fig. 1. The two pins are held in their adjusted position by a suitable spring 398 which engages either one of a pair of grooves 399 on the pins. Thus, whenever a pin is depressed by the cam 390, it is pushed inwardly (to the right in Fig. 1) so that the right-hand end extends beyond the gear 396. The latch member 381, and particularly the rearward arm 385 thereof, lies between the gear 396 and the auxiliary supporting plate 22 (to the right of the gear as shown in Fig. 1) and is provided with a camming tip 386 which is adapted to be engaged by the displaced pin 391 shortly after the start of the second cycle of operation. In Fig. 13 the left-hand pin 391 would be displaced by the cam 390 and in the first cycle of operation would rotate 180° to the position of the right-hand pin. The right-hand pin not being displaced will not engage the arm 385 during its travel clockwise. However, the displaced pin 391, shortly after the beginning of the second cycle of operation will engage the end 386 of the arm 385, rocking the latch 381 counter-clockwise and thus disengaging the latch 381 from the link 357. This permits the link to be pulled to the right by the spring, not shown, which normally holds the shaft 220 in its clockwise position. By this means the power operated shifting control is released shortly after the start of the second, or carriage shifting, cycle of operation. However, the motor switch is held closed and the clutch engaged until the end of this second cycle by conventional means included in the machine. The displaced pin is restored by a suitable cam 400, after approximately 270° of rotation.

It will be recalled that the initiation of division by depression of the division key 270 operates through lever 277 (Fig. 11) and arm 280 to rock a shaft 281 counter-clockwise as viewed from the left. The shaft 281 is extended across the machine to the auxiliary supporting plate 22, as shown in Figs. 1 and 12. An arm 405 is pinned to the shaft 281 adjacent the left end thereof. This arm is provided with a hook 406 which is adapted to engage the stud 353 on the three-armed setting lever 346, as shown in Fig. 12. Thus, the initiation of division operation, with the square root control lever in its forward or operative condition, causes rocking of the arm 405 (counter-clockwise in Fig. 12) thereby engaging the stud 353 to latch the three-armed setting lever 346 in its inoperative position. It is therefore impossible for the square root control mechanism to operate during division. It will be understood that the overdraft and keyboard locking mechanism can be operated upon overdrafts during division without effecting division operations, as at the time the division key is depressed the values then set in the keyboard remain unchanged throughout the balance of the calculation.

2. *Counter control.*—It will be recalled that a second effect of the rocking of the square root control lever 300 to its forward, or operative, position is to set the counter to count in an unlike manner with respect to the accumulator, whereby negative cycles will be counted positively and vice versa. This is accomplished by means of the extended pin 303 which pins the link 302 to the lever 300 (Fig. 1). The mechanism for setting the counter-control is shown particularly in Figs. 1, 2, 10 and 10A. As shown in Fig. 1, the pin 303, when the lever 300 is in its rearward, or inactive, position, adjoins the upright portion 410 of a longitudinally extending link 411. Link 411 is supported adjacent its rear end in the cross bracket 412 extending between the left-hand supporting plate 20 and auxiliary plate 22. The link is held in either adjusted position by a conventional detent 413. The forward end of the link 411 is pivotally mounted on and supported by a bellcrank lever 415 to which it is pinned by a suitable machine bolt 416. The bellcrank 415 is pivotally mounted on the cross shaft 417. The forward end 418 of the bellcrank 415 overlies the live tip 420 of an arm 421 which is pinned, or otherwise rigidly secured, to the cross shaft 417. The live tip 420 is resiliently held to arm 421 by a suitable spring 422.

The cross shaft 417 extends entirely across the front of the machine being suitably journalled in bearings in the left-hand supporting plate 20 and the right-hand supporting plate 21. An arm 425 (see Figs. 2 and 10A) is keyed on, or otherwise rigidly secured to, the right-hand end of the cross shaft 417. A rearwardly extending link 426 is pivotally mounted on the arm 425 by any suitable means such as stud 427. The rear end of the link 426 is provided with a suitable slot 428 (Fig. 10) which embraces a stud 429 on the counter-control link 430. The counter-control link 430 corresponds to the link 63 of Patent No. 2,294,111 previously mentioned in connection with the counter-control mechanism. This link controls, in known manner, the counter-control mechanism 431 described in said patent. It is thus obvious that if the counter-control is set for like counting, the forward rocking of the square root control lever 300 simultaneously moves the link 411 forwardly. This, in turn, rocks the cross shaft 417 (counter-clockwise in Fig. 10A) and pulls the links 426 and 430 forwardly. Such movement of the link 430 sets the counter-control mechanism 431 to count in a manner of opposite sign character to that of the accumulator, so as to get a positive count in subtractive operations.

3. *Modification of single cycle operation.*—The third effect of the rocking of the square root control lever 300 forward to its operative position is to condition the "add" key mechanism to limit the operation of the machine to a single cycle while simultaneously disabling the normal keyboard clear mechanism of the "add" key. To accomplish this purpose a forwardly extending link 440 (see Figs. 1 and 11) is pivotally mounted on the lever 300 below its supporting shaft 301, as by pin 441, so that forward rocking of the control lever pulls the link 440 rearwardly. The forward end of the link 440 is pivotally mounted on an upright arm 442 of a cross bail 443. The bail 443 extends across the machine from the left-hand supporting plate 20 to the right of the right-hand supporting plate 21 and carries an integral arm 444 on its right end (see Fig. 10A). The bail 443 is rotatably mounted on the cross shaft 417, as shown. The right-hand arm 444 carries a screw 445 which is embraced in a slot 446 of a link 447 (see Figs. 10, 10A and 2). The link 447 is pivotally connected to a downwardly extending arm 448 of the "add" key lever 111, being pivotally mounted thereon by any suitable means such as pin 449. Thus the rocking of the square root control lever 300 to its operative position simultaneously rocks the "add" key lever 111 to its forward, or operative, position. This sets the mechanism above described for limiting the operation of the machine to a single cycle, even though a control key is held depressed.

However, as mentioned above, in square root extraction, it is necessary to retain the keyboard value in the keyboard at all times. Therefore means are provided for disabling the keyboard clearing portion of the "add" key device when the square root control lever 300 is rocked to its operative position. This means is shown particularly in Fig. 7 and comprises an arm 450 integral with the bail 443 and extending rearwardly where it terminates in an ear 451. When the bail is rocked (counter-clockwise in Fig. 7), the ear 451 drops behind the upper end of the clearing bail 441, thereby locking it against movement. It will be recalled that the clearing bail 141 is normally operated through a live pawl 140 and spring 143, so that the normal reciprocation of the link 134 (Fig. 8) is no longer effective to move the keyboard clear bail 141. In this manner the values set in the keyboard are retained at all times.

*Operation*

It is believed that the foregoing description of the mechanism of my invention has disclosed how the machine operates for the extraction of square root. When my invention is applied to a conventional Friden automatic calculating machine, the operation of the extraction of square root is quite simple. The factor for which the square root is to be extracted is set into the accumulator in any conventional manner. Preferably, the factor will be set above the left-hand portion of the keyboard, with the carriage shifted to its extreme right-hand position. The square root control key 300 is thereupon pulled forwardly, which sets the three controls above described: It sets the counter-control to count positively during subtractive operations; it sets the "add" key, or single cycle, mechanism so as to limit the operation of the machine to a single cycle even though a control key is held depressed and simultaneously disables the normal keyboard clearing mechanism which is set by the single cycle controls; and thirdly, it sets the mechanism controlled by link 302 so that an overdraft in a predetermined order locks the keyboard against change and rocks the shaft 318 to initiate the automatic control of the single additive corrective cycle followed by the automatic shifting of the carriage one step to the left. After setting of the factor (mentally grouping them in groups of twos from the decimal point), the operator begins the subtraction of successive odd numbers beginning with "1" in the order under the right-hand figure of the leftmost group of two. Thus, the operator first subtracts "1," then "3," then "5," etc., until he has subtracted a value which causes an overdraft. The overdraft mechanism is operative to cause locking of the keyboard against further change, to automatically cause the additive corrective cycle, and to shift the carriage one step to the left. Thereupon the operator decreases the value then standing in the keyboard by "1" and begins the subtraction of successive odd numbers again. This procedure can be followed until the square root has been extracted to the full extent of the carriage, or accumulator, dials. However, in most instances accuracy is only necessary to the first nine significant figures so that practically the extraction of square root can be expedited and simplified by depressing the division key and initiating a division operation when the square root has been extracted through five or six orders.

I claim:

1. A calculating machine comprising a keyboard, a carriage, an accumulator and a counter mounted in said carriage, a tens-transfer mechanism between the respective orders of the accumulator, means for shifting said carriage with respect to said keyboard, a locking means for locking values in the keyboard, an actuator operative to transmit values from the keyboard into the accumulator additively or subtractively, and means operated by the tens-transfer mechanism in a selected order for locking the keyboard, for initiating a single additive cycle of the actuator, and for subsequently initiating a carriage shift of one order to the left.

2. A calculating machine comprising a keyboard, a carriage, an accumulator and a counter mounted in said carriage, a tens-transfer mechanism between the respective orders of the accumulator, means for shifting said carriage with respect to said keyboard, a locking means for locking values in the keyboard, and an actuator operative to transmit values from the keyboard into the accumulator additively or subtractively, and means operated by the tens-transfer mechanism in a selected order for locking the keyboard, for initiating a single additive cycle of the actuator, for subsequently initiating a carriage shift of one order to the left, and for finally unlocking the keyboard.

3. In a calculating machine having an accumulator, a keyboard, a locking means for locking values in the keyboard, an actuator operative to transmit values from the keyboard into the accumulator additively or subtractively, means for shifting said accumulator with respect to said actuator, and means for sensing an overdraft in a preselected order of the accumulator: the combination which comprises means operated by said sensing means for locking the keyboard, for initiating a single additive cycle of the actuator, and for subsequently initiating a shift of the accumulator one order to the left.

4. In a calculating machine having an ordinally arranged accumulator, tens-transfer mechanisms between the orders of said accumulator, a keyboard, a locking means for locking values in the keyboard, an actuator operative to transmit values from the keyboard into the accumulator additively or subtractively, and means for shifting said accumulator with respect to said keyboard: the combination which comprises a mechanism operated by said tens-transfer mechanism in a preselected order and operable to lock the keyboard, to initiate a single additive cycle of operation of the actuator, to subsequently initiate a shift of the accumulator one order to the left, and finally release the keyboard lock mechanism.

5. A calculating machine adapted for the extraction of square root comprising a keyboard, actuator mechanisms settable from said keyboard, a factor register shiftable with respect to said actuator, ordinal latching means for the keys of said keyboard, digitation control means positionable to enter values transmitted by the actuator into the register additively or subtractively, a counter, means for sensing an overdraft in a preselected order of the register, means operated by said sensing means for locking the keyboard latching means against movement, a two-cycle control means operated by said sensing means for initiating operation of the machine, for positioning the digitation control means for addition during the first cycle of operation, and for initiating a carriage shift of one order to the left during the second cycle of operation, and means for releasing the keyboard lock during the second cycle of operation.

6. A calculating machine adapted for the extraction of square root comprising a keyboard, actuator mechanism settable from said keyboard, a factor register, said register and said actuator mechanism being shiftable with respect to each other, positionable means for shifting the shiftable one of said register or actuator mechanism in either direction, ordinal latching means for the keys of said keyboard, digitation control means positionable to enter values transmitted by the actuator into the register additively or subtractively, a counter, means for sensing an overdraft in a preselected order of the register, a control means operated by said sensing means for initiating operation of the machine, for positioning the digitation control means for addition during the first cycle of operation, and for positioning the shifting means to shift the shiftable one of said register or actuator mechanism so that the actuator mechanism will operate in a lower order of said register, and means operated by said sensing means for locking the keyboard latching means against movement during operation of said control means.

7. In a calculating machine having an accumulator, a keyboard, a locking means for locking values in the keyboard, an actuator operative to transmit values from the keyboard into the accumulator additively or subtractively, means for shifting said accumulator with respect to said keyboard, mechanism normally limiting operation of the actuator to a single cycle, and means for sensing an overdraft in a preselected order of the accumulator: the combination which comprises means operated by said sensing means for locking the keyboard, for superseding the mechanism for limiting operation to a single cycle, for initiating a single additive cycle of the actuator, for subsequently initiating a shift of the accumulator one order to the left, and for releasing the keyboard locking means during the shifting of the accumulator.

8. In a calculating machine having an ordinally arranged accumulator, a tens-transfer mechanism between the respective orders of the accumulator, a keyboard, an ordinal key latch for each order of the keyboard, an actuator, registration control means positionable to cause values transmitted by the actuator to be entered into the accumulator additively or subtractively, actuator power driving means including a motor switch and a normally open drive clutch, and means including a left shift clutch for shifting said accumulator with respect to said keyboard: the combination which comprises means operated by the tens-transfer mechanism in a preselected order and operable to block the keyboard latches against movement, to close said motor switch and engage said drive clutch, to shift said registration control mechanism to a position for additive operation for a single cycle of operation, then to release said registration control mechanism and to engage said left shift clutch, and finally open said switch and disengage both said clutches after shifting said carriage a single step.

9. In a calculating machine having an ordinally arranged keyboard, ordinal latching means for locking values in the various orders of the keyboard, a shiftable carriage, an ordinally arranged accumulator in said carriage, a counter, counter-control means operative to count the cycles of operation with a sign character selectively like or unlike with respect to said accumulator, an actuator operative to transmit values from the keyboard into the accumulator additively or subtractively, a single cycle mechanism operative when set to operative condition to limit operation of the actuator to a single cycle, keyboard clearing means normally operated in synchronism with said single cycle mechanism and operative to clear the keyboard toward the end of a first cycle of operation, and means for sensing an overdraft in a preselected order of the accumulator: the combination which comprises a settable control mechanism operable by said sensing means for locking the ordinal latching means against operation, for initiating a single additive cycle of the actuator, and for subsequently initiating a carriage shift of one order to the left, and a manually set conditioning means operative, when set to operative position, to set said counter-control means for unlike counting, to set said single cycle mechanism to operative condition, to block operation of said keyboard clearing means, and to condition said control mechanism for operation by said sensing means.

10. In a calculating machine having an ordinally arranged keyboard, ordinal latching means for locking values in the various orders of the keyboard, a shiftable carriage, means including a left shift clutch for shifting said carriage, an ordinally arranged accumulator in said carriage, a tens-transfer mechanism between the respective orders of the accumulator, a counter, counter-control means operative to count the cycles of operation with a sign character selectively like or unlike with respect to said accumulator, an actuator, actuator driving means including a motor switch and a clutch, registration control means positionable to cause values to be transmitted from the keyboard into the accumulator additively or subtractively, a single cycle mechanism operative when set to operative condition to limit operation of the actuator to a single cycle, and keyboard clearing means normally operated in synchronism with said single cycle mechanism and operative to clear the keyboard toward the end of a first cycle of operation: the combination which comprises a control mechanism operated by the tens-transfer mechanism in a preselected order to lock the ordinal latching means against operation, to close said motor switch and engage said clutch, to shift said registration control mechanism to a position for additive registration, to release said registration control mechanism during the first cycle operation, to engage said left shift clutch, and finally open said switch and disengage said clutches during the second cycle of operation; and a manually set conditioning means operative, when set to operative position, to set said counter-control means for unlike counting, to set said single cycle mechanism to operative condition, to block operation of said keyboard clearing means, and to condition said control mechanism for operation by said tens-transfer mechanism.

11. A calculating machine comprising a keyboard containing a plurality of positionable value selection keys, a carriage ordinally shiftable with respect to said keyboard, an ordinally arranged register mounted in said carriage, a tens-transfer mechanism between the respective orders of said register, a keyboard locking means for locking the value selection keys against change of position, a manually operable conditioning member, and means conditioned for operation by said member and operated by the tens-transfer mechanism in a preselected order for operating the locking means.

12. A calculating machine comprising a keyboard, a shiftable carriage, an ordinal register mounted in said carriage, a tens-transfer mechanism between the respective orders of said register, a locking means for locking values in the keyboard, a program mechanism for controlling operation of the machine through a predetermined sequence of operations, a manually operated control member, means conditioned for operation by said control member and operated by said tens-transfer mechanism in a preselected order for operating the locking means and for initiating operation of said program mechanism, and means for holding said locking means operative throughout operation of said program mechanism.

13. A calculating machine comprising a keyboard, an ordinal register, a tens-transfer mechanism between the respective orders of said register, reversible differential actuating means operative to transmit values from said keyboard to said register additively or subtractively, a locking means for locking values in the keyboard, a manually operable conditioning member, a normally inoperative means conditioned for operation by said member and, when so conditioned, operable by the tens-transfer mechanism in a preselected order for operating the locking means and for initiating a single reversed cycle of said actuating means.

14. A calculating machine comprising a keyboard, an ordinal register, means for shifting said register, an overdraft mechanism in a predetermined order of said register, a locking means for locking values in the keyboard, a manually operable conditioning member, a normally inoperative means conditioned for operation by said member and, when so conditioned, operable by the said overdraft mechanism for operating the locking means and for initiating operation of said shifting means for a single shifting movement of said register.

15. A calculating machine comprising a keyboard, an ordinally arranged cyclically operable actuator mechanism, an ordinal register mechanism, one of said mechanisms being ordinally shiftable with respect to the other, a shifting means for shifting the shiftable one of said mechanisms, an overdraft sensing means operable in the cycle in which the keyboard value exceeds the register value, a locking means for locking values in the keyboard, a manually operable conditioning member, a normally inoperative means conditioned for operation by said member and, when so conditioned, operable by the overdraft sensing means for operating the locking means and operating said shifting means for a single shifting movement, and means operable to release the locking means at the completion of operation of said shifting means.

16. A calculating machine comprising a keyboard, an ordinal register, a cyclically operable differential drive means operative to transmit values from the keyboard to the register, reversible means for operating said drive means additively or subtractively, an overdraft sensing means operable in the cycle in which the keyboard value is greater than the register value, a locking means for locking values in the keyboard, a manually operable conditioning member, a normally inoperative means conditioned for operation by said member and, when so conditioned, operable by the overdraft sensing means for operating the locking means, for reversing the reversible means, and for initiating operation of the differential drive means.

17. A calculating machine comprising a keyboard, a locking means for locking values in the keyboard, a carriage, an accumulator mounted in said carriage, a tens-transfer mechanism between the respective orders of the accumulator, means for shifting said carriage in either direction with respect to said keyboard, an actuator operative to transmit values from the keyboard into the accumulator additively or subtractively, a manually operable conditioning member, a normally inoperative means conditioned for operation by said member and, when so conditioned, operable by the tens-transfer mechanism in a selected order for operating the locking means and the shifting means, and means operated during such shifting operation for disabling the locking means.

18. A calculating machine comprising a keyboard, a shiftable carriage, an ordinal register mounted in said carriage, a reversible differential actuating means operative to transmit values additively or subtractively from said keyboard into said register, a tens-transfer mechanism between the respective orders of said register, a locking means for locking values in the keyboard, a manually operated control member, means conditioned for operation by said control member and operated by the tens-transfer mechanism in a preselected order for operating the locking means, for initiating a single reversed operation of said actuating means, and means operable to release said locking means after completion of the reversed operation of said actuating means.

19. A calculating machine comprising a keyboard, a shiftable carriage, an ordinal register mounted in said carriage, means for shifting said carriage, an overdraft mechanism in a predetermined order of said register, a locking means for locking values in said keyboard, a manually operated control member, and means controlled by said control member and operated by said overdraft mechanism for operating the locking means, for initiating a single operation of the shifting means, and subsequently releasing said locking means.

20. The calculating machine comprising a keyboard containing a plurality of value selection keys operable to determine values entered into the machine, an ordinally arranged register, a tens-transfer mechanism between the respective orders of said register, a keyboard locking means for locking the value selection keys against change, a programming means for controlling a predetermined sequence of operations, and means operated by the tens-transfer mechanism in a preselected order of the register for operating said locking means and said programming means.

21. A calculating machine comprising an ordinally arranged register, a tens-transfer mechanism between the respective orders of said register, a keyboard containing a plurality of value selection keys operative to control the entry of values into the register, a division mechanism operative to divide a factor set in the keyboard into a dividend factor registered in said register, a locking means for locking the value selection keys against change, a manually operated conditioning member, a control mechanism conditioned for operation by operation of said conditioning member and operated by the tens-transfer mechanism in a preselected order of the register for operating the locking means, and means operated by the division mechanism for disabling the control mechanism.

References Cited in the file of this patent

UNITED STATES PATENTS

| | | |
|---|---|---|
| 1,773,026 | Chase | Aug. 12, 1930 |
| 1,819,066 | Bernau | Aug. 18, 1931 |
| 1,981,226 | Friden | Nov. 20, 1934 |
| 1,993,626 | Robertson | Mar. 5, 1935 |
| 2,046,820 | Hilder | July 7, 1936 |
| 2,229,889 | Friden | Jan. 28, 1941 |
| 2,391,089 | Friden | Dec. 18, 1945 |

FOREIGN PATENTS

| | | |
|---|---|---|
| 794,623 | France | Dec. 12, 1935 |